United States Patent
Kim et al.

(10) Patent No.: US 11,894,566 B2
(45) Date of Patent: Feb. 6, 2024

(54) CATALYST MATERIALS FOR A FUEL CELL STACK

(71) Applicant: Robert Bosch GmbH, Stuttgart (DE)

(72) Inventors: Soo Kim, Cambridge, MA (US);
Jonathan Mailoa, Cambridge, MA (US); Ulrich Berner, Stuttgart (DE);
Nathan Craig, Santa Clara, CA (US);
Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 15/930,074

(22) Filed: May 12, 2020

(65) Prior Publication Data
US 2021/0359310 A1    Nov. 18, 2021

(51) Int. Cl.
*H01M 4/92* (2006.01)
*H01M 8/1004* (2016.01)
(Continued)

(52) U.S. Cl.
CPC ....... *H01M 4/921* (2013.01); *H01M 8/04388* (2013.01); *H01M 8/04395* (2013.01); *H01M 8/1004* (2013.01); *H01M 8/2483* (2016.02)

(58) Field of Classification Search
CPC ......... H01M 8/04388; H01M 8/04395; H01M 4/921; H01M 8/04313
(Continued)

(56) References Cited

U.S. PATENT DOCUMENTS

| 4,457,822 A | 7/1984 | Asano et al. |
| 7,566,681 B2 | 7/2009 | Bock et al. |

(Continued)

FOREIGN PATENT DOCUMENTS

| CN | 101237056 A | 8/2008 |
| CN | 112084685 A | 12/2020 |

(Continued)

OTHER PUBLICATIONS

Y, Chen, et al. "A Review of Computational Fluid Dynamics Simulations on PEFC Performance." Journal of Applied Mechanical Engineering, vol. 05, No. 06, 2016, https://doi.org/10.4172/2168-9873.1000241 (Year: 2016).*

(Continued)

*Primary Examiner* — Kourtney R S Carlson
(74) *Attorney, Agent, or Firm* — Brooks Kushman P.C.

(57) ABSTRACT

A fuel cell stack includes a first end region, a second end region, and a middle region. At least one of a first number of fuel cell units in the first end region is a first fuel cell unit including a membrane electrode assembly (MEA) with a first catalyst material on either or both an anode and a cathode of the first fuel cell unit. At least one of a second number of fuel cell units in the second end region is a second fuel cell unit including an MEA with a second catalyst material on either or both an anode and a cathode of the first fuel cell unit. The middle region is situated between the first and the second end region. At least one of a third number of fuel cell units in the middle region is a third fuel cell unit including an MEA with a third catalyst material on either or both an anode and a cathode of the first fuel cell unit. At least one of the first, the second, and the third catalyst material are different.

20 Claims, 16 Drawing Sheets

(51) Int. Cl.
  *H01M 8/0438* (2016.01)
  *H01M 8/2483* (2016.01)

(58) Field of Classification Search
  USPC .......................................................... 429/452
  See application file for complete search history.

(56) References Cited

U.S. PATENT DOCUMENTS

| | | | |
|---|---|---|---|
| 7,638,227 | B2 | 12/2009 | Kanno et al. |
| 8,173,324 | B2 | 5/2012 | Fisher et al. |
| 8,620,637 | B2 | 12/2013 | Fujiuchi et al. |
| 9,186,653 | B2 | 11/2015 | Mukerjee et al. |
| 2006/0083970 | A1 | 4/2006 | Shibutani et al. |
| 2008/0286616 | A1 | 11/2008 | Motupally et al. |
| 2009/0136816 | A1 | 5/2009 | Kang et al. |
| 2010/0173216 | A1 | 7/2010 | Tang et al. |
| 2010/0248086 | A1 | 9/2010 | Nobuhara et al. |
| 2011/0097651 | A1* | 4/2011 | Yim ................. H01M 4/8825 429/535 |
| 2011/0143263 | A1* | 6/2011 | Shirvanian ......... H01M 8/1097 429/523 |
| 2012/0308907 | A1 | 12/2012 | Peled et al. |
| 2013/0164655 | A1 | 6/2013 | Kremliakova |
| 2014/0171290 | A1* | 6/2014 | Lopez ..................... B01J 37/08 502/182 |
| 2014/0246304 | A1 | 9/2014 | Debe et al. |
| 2016/0013495 | A1 | 1/2016 | Ishida et al. |
| 2016/0104898 | A1 | 4/2016 | Bonastre et al. |
| 2017/0250410 | A1 | 8/2017 | Yang et al. |
| 2018/0166695 | A1 | 6/2018 | Ball et al. |
| 2018/0214943 | A1 | 8/2018 | Xia et al. |

FOREIGN PATENT DOCUMENTS

| | | |
|---|---|---|
| EP | 1408569 A2 | 4/2004 |
| EP | 1922777 B1 | 11/2011 |
| WO | 2014/005599 A1 | 1/2014 |

OTHER PUBLICATIONS

Guo, Shaojun, et al. "Tuning Nanoparticle Catalysis for the Oxygen Reduction Reaction." Angewandte Chemie International Edition, vol. 52, No. 33, 2013, pp. 8526-8544., https://doi.org/10.1002/anie.201207186. (Year: 2013).*

Markovic, N. "Surface Science Studies of Model Fuel Cell Electrocatalysts." Surface Science Reports, vol. 45, No. 4-6, 2002, pp. 117-229., https://doi.org/10.1016/s0167-5729(01)00022-x. (Year: 2002).*

Papadias, D. D., et al. "Durability of Pt—Co Alloy Polymer Electrolyte Fuel Cell Cathode Catalysts under Accelerated Stress Tests." Journal of The Electrochemical Society, vol. 165, No. 6, 2018, https://doi.org/10.1149/2.0171806jes. (Year: 2018).*

Wu et al., "Real-time monitoring of proton exchange membrane fuel cell stack failure", J Appl Electrochem (2016) 46:1157-1162, Aug. 2, 2016, 6 pages.

Lopes et al., "Relationships between Atomic Level Surface Structure and Stability Activity of Platinum Surface Atoms in Aqueous Environments", ACS Catal. 2016, 6, 2536-2544, Mar. 7, 2016, 9 pages.

Eguchi et al., "Influence of Ionomer Carbon Ratio on the Performance of a Polymer Electrolyte Fuel Cell", Polymers 2012, 4, 1645-1656; doi:10.3390/polym4041645, Nov. 20, 2012, 12 pages.

Chi, M. et al. "Surface faceting and elemental diffusion behaviour at atomic scale for alloy nanoparticles during in situ annealing," Nature Communications, Nov. 18, 2015, vol. 6, No. 8925, pp. 1-9, DOI: 10.1038/ncomms9925.

Dumont, Joseph Henry, "Ternary PtRuPd/C Catalyst for High-Performance, Low-Temperature Direct Dimethyl Ether Fuel Cells," ChemElectroChem, vol. 3, No. 10, Oct. 2016, 7 pages total, DOI: 10.1002/celc.201600336.

Kobayashi, S. et al., Effect of Alloy Composition and Crystal Face of Pt-Skin/Pt100-xCox [(111), (100), and (110)] Single Crystal Electrodes on the Oxygen Reduction Reaction Activity The Journal of Physical Chemistry C, vol. 121, No. 21, May 11, 2017, pp. 11234-11240, DOI: 10.1021/acs.jpcc.6b12567.

Lee, Seung Woo et al., "Multifunctional non-Pt ternary catalyst for the hydrogen oxidation and oxygen evolution reactions in reversal-tolerant anode," Catalysis Communications, vol. 130, Jul. 13, 2019, 5 pages total, https://doi.org/10.1016/j.catcom.2019.105758.

Lee, Yi-Juei et al., "Dealloyed Pt2Os nanoparticles for enhanced oxygen reduction reaction in acidic electrolytes," Applied Catalysis B: Environmental vol. 150-151, 2014, pp. 636-646, DOI: 10.1016/j.apcatb.2014.01.004.

Lovic, Jelena D. et al., "Electrocatalytic properties of Pt-Bi electrodes towards the electro-oxidation of formic acid," Journal of Serbian Chemical Society, vol. 78, No. 8, 2013, pp. 1189-1202, DOI: 10.2298/JSC121012138L.

Mun, B. S. et al., "The study of surface segregation, structure, and valence band density of states of Pt3Ni(100), (110), and (111) crystals," Surface Review and Letters, vol. 13, No. 05, 2006, pp. 697-702, DOI: 10.1142/S0218625X06008682.

Qin, Congwei et al., "Proton Exchange Membrane Fuel Cell Reversal: A Review," Catalysts, vol. 6, No. 197, Dec. 8, 2016, pp. 1-21, DOI: 10.3390/catal6120197.

Ralph, Thomas R. et al., "Electrocatalyst Stability In PEMFCs And The Role Of Fuel Starvation And Cell Reversal Tolerant Anodes," ECS Transactions, vol. 1, No. 8, 2006, 19 pages total, DOI: 10.1149/1.2214545.

Sivakumar, Pasupathi et al., "Pt-Ru-Ir Nanoparticles Prepared by Vapor Deposition as a Very Efficient Anode Catalyst for Methanol Fuel Cells," Electrochemical and Solid-State Letters, vol. 9, No. 3, 2006, pp. A167-A170, DOI: 10.1149/1.2165709.

Taniguchi, Akira et al., "Analysis of electrocatalyst degradation in PEMFC caused by cell reversal during fuel starvation," Journal of Power Sources, vol. 130, 2004, pp. 42-49, DOI: 10.1016/j.jpowsour.2003.12.035.

Van Der Vliet et al., "Unique Electrochemical Adsorption Properties of Pt-Skin Surfaces," Angewandte Chemie, 2012, 124, 3193-3196, DOI: 10.1002/ange.201107668, Feb. 20, 2012, 4 pages.

Wang et al., "Synthesis of Homogeneous Pt-Bimetallic Nanoparticles as Highly Efficient Electrocatalysts," ACS Catalysis, 2011, 1, 1355-1359, DOI: 10.1021/cs200328z, Aug. 25, 2011, 5 pages.

You, Eunyoung et al., "Highly Durable, Cost-Effective, and Multifunctional Carbon-Supported IrRu-Based Catalyst for Automotive Polymer Electrolyte Fuel Cell Anodes," Journal of The Electrochemical Society, vol. 165, No. 6, Mar. 5, 2018, pp. F3094-F3099, DOI: 10.1149/2.0121806jes.

Zhou, W.J. et al., "Pt-based anode catalysts for direct ethanol fuel cells," Solid State Ionics, vol. 175, 2004, pp. 797-803, DOI: 10.1016/j.ssi.2004.09.055.

Zhou, Xiangyang et al., "High-Repetitive Reversal Tolerant Performance of Proton-Exchange Membrane Fuel Cell by Designing a Suitable Anode," ACS Omega, vol. 5, Apr. 21, 2020, p. 10099-10105, https://dx.doi.org/10.1021/acsomega.0c00638.

International Search Report issued in PCT/US2022/046013, dated Feb. 10, 2023, 4 pages.

Jian, X.-H. et al., "Pt—Ru and Pt—Mo electrodeposited onto Ir—IrO2 nanorods and their catalytic activities in methanol and ethanol oxidation," Journal of Materials Chemistry, 2009, vol. 19, No. 11, pp. 1601-1607, DOI: 10.1039/b816255g.

Xu, J. B. et al., "Synthesis of Active Platinum-Silver Alloy Electrocatalyst toward the Formic Acid Oxidation Reaction," The Journal of Physical Chemistry, 2008, vol. 112, No. 44, pp. 17362-17367, DOI: 10.1021/jp8063933.

* cited by examiner

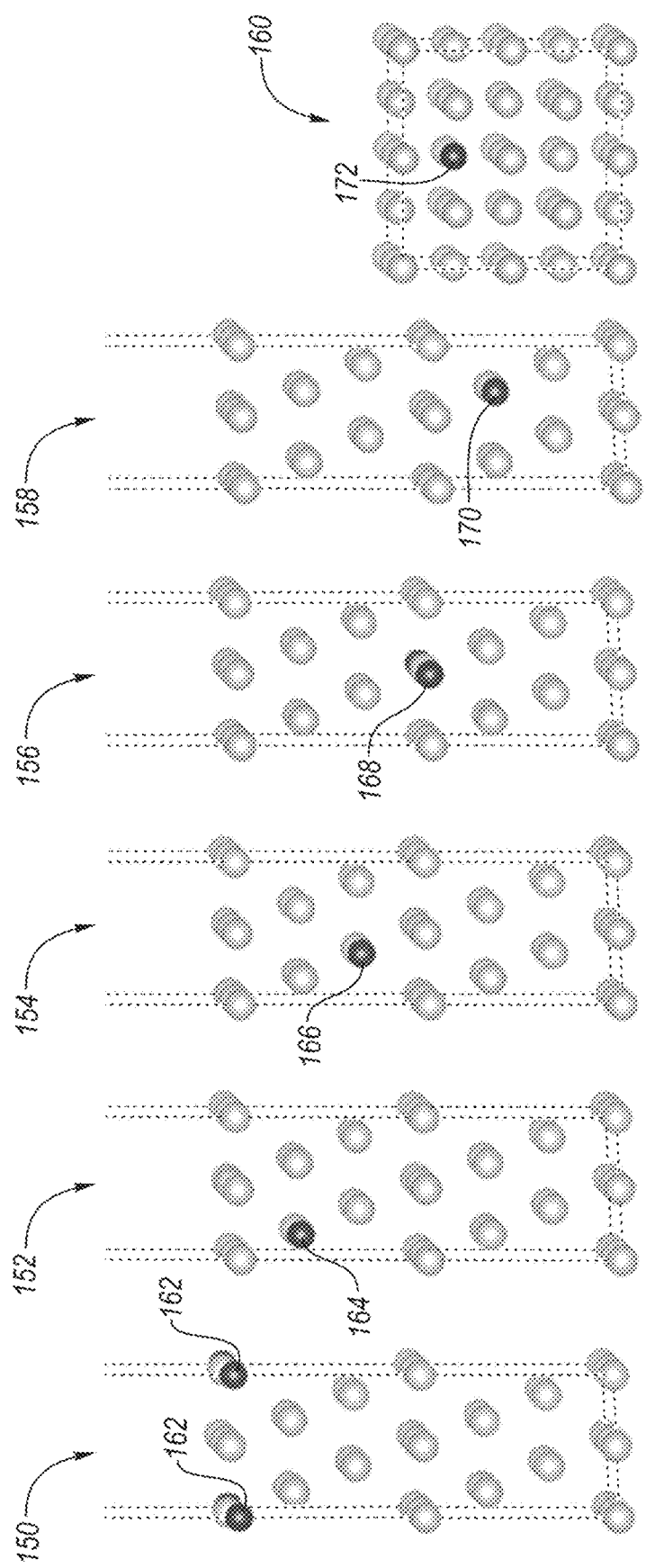

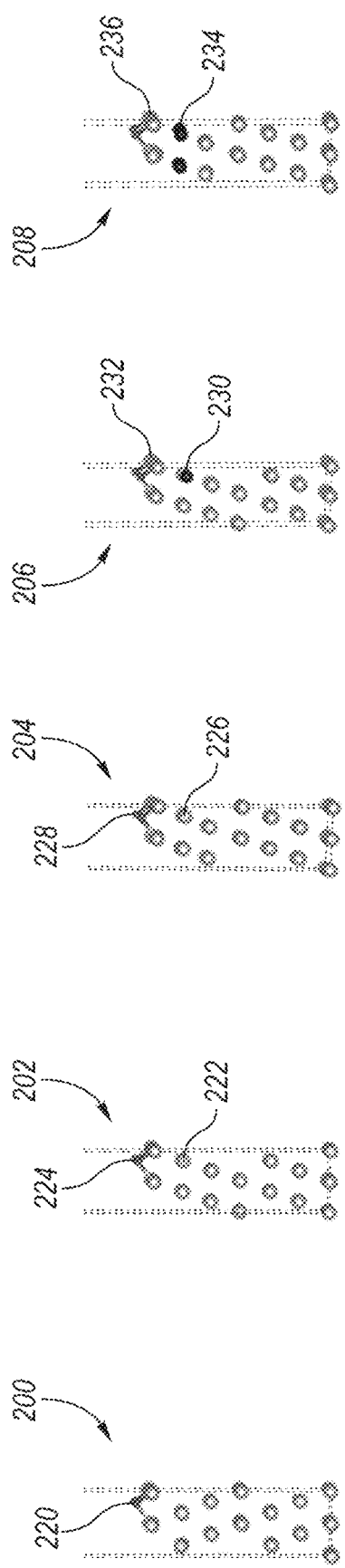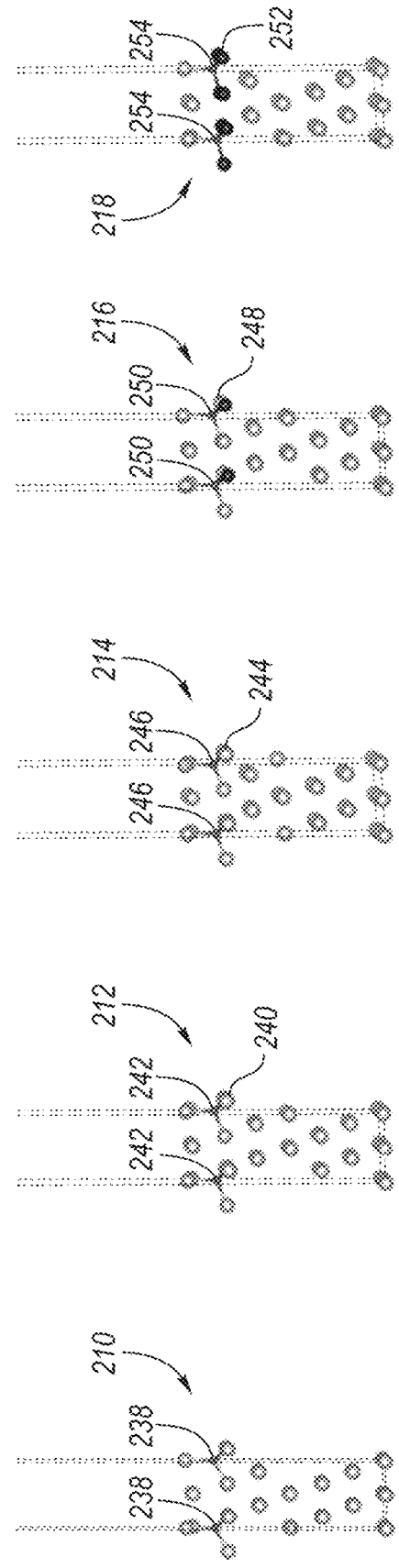

| Pt | γ[J/m²] | SA [%] |
|---|---|---|
| (111) | 1.59 | 63.6 |
| R-(110) | 1.82 | 14.9 |
| (100) | 1.95 | 21.5 |

| Pt₃Co | γ[J/m²] | SA [%] |
|---|---|---|
| (111) | 1.79 | 95.3 |
| R-(110) | 2.29 | 0.0 |
| R-(100) | 2.62 | 4.7 |

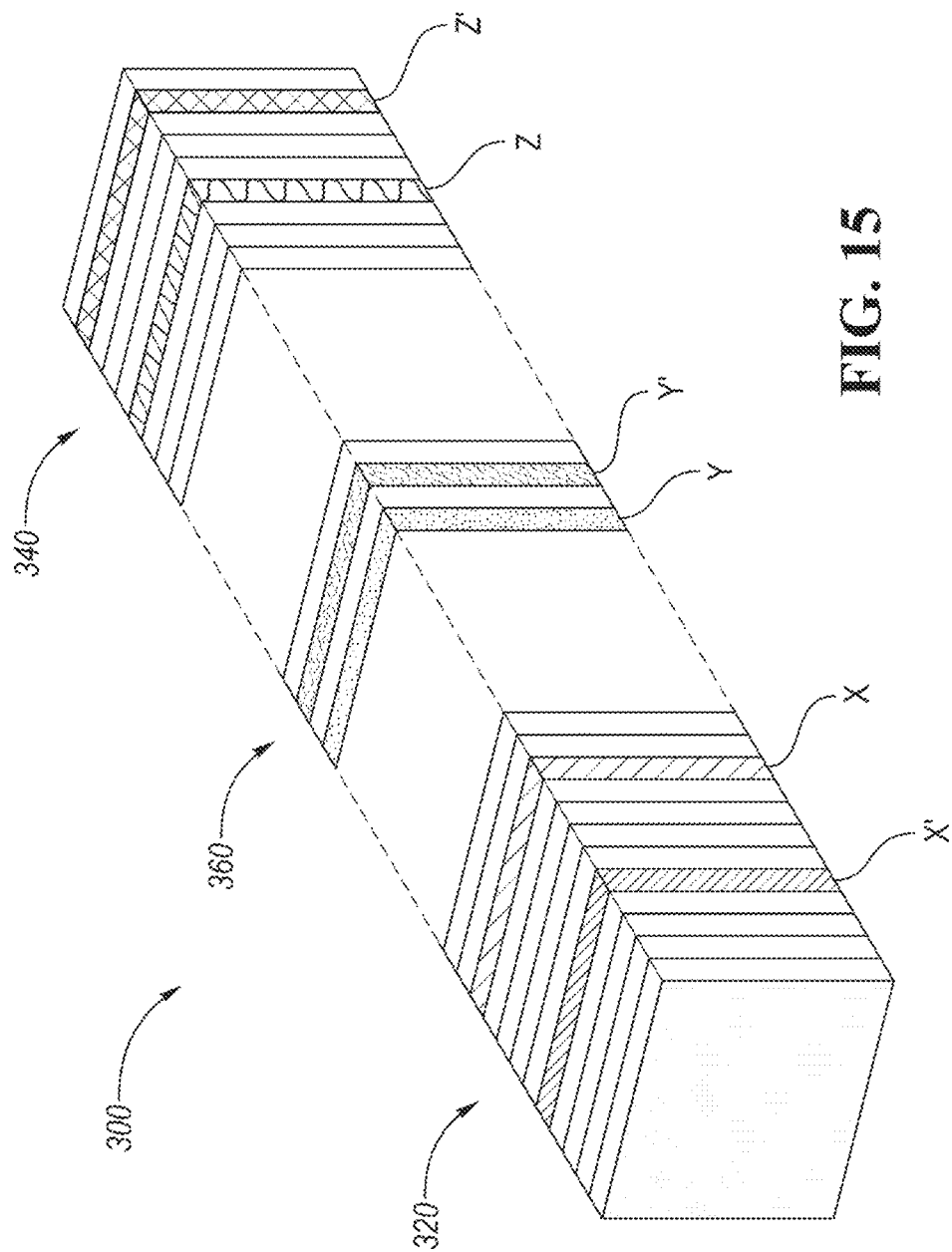

CATALYST MATERIALS FOR A FUEL CELL STACK

TECHNICAL FIELD

The present disclosure relates to catalyst materials for a fuel cell stack, for example, a proton exchange membrane fuel cell stack.

BACKGROUND

Fuel cells have shown promise as an alternative power source for vehicles and other transportation applications. Fuel cells operate with a renewable energy carrier, such as hydrogen. Fuel cells also operate without toxic emissions or greenhouse gases. One of the current limitations of widespread adoption and use of this clean and sustainable technology is the relatively expensive cost of the fuel cell stack. A catalyst material (e.g. platinum catalyst material) is included in the catalyst layer of both the anode and the cathode of the fuel cell. The catalyst material is one of the most expensive components of the fuel cell stack.

SUMMARY

According to one embodiment, a fuel cell stack is disclosed. The fuel cell stack includes a first end region having a first number of fuel cell units. The first end region is connected to a first reactant inlet, and the first reactant inlet is connected to a first reactant source configured to provide a first reactant to the fuel cell stack. The first reactant source is a hydrogen source. At least one of the first number of fuel cell units is a first fuel cell unit including a membrane electrode assembly (MEA) with a first catalyst material on either or both an anode and a cathode of the first fuel cell unit, and the first catalyst material includes a first catalyst composition. The fuel cell stack also includes a second end region having a second number of fuel cell units. The second end region is connected to a second reactant inlet, and the second reactant inlet is connected to a second reactant source configured to provide a second reactant to the fuel cell stack. The second reactant source is an oxygen source. At least one of the second number of fuel cell units is a second fuel cell unit including an MEA with a second catalyst material on either or both an anode and a cathode of the second fuel cell unit, and the second catalyst material includes a second catalyst composition. The fuel cell stack further includes a middle region having a third number of fuel cell units. The middle region is situated between the first and the second end region. At least one of the third number of fuel cell units is a third fuel cell unit including an MEA with a third catalyst material on either or both an anode and a cathode of the third fuel cell unit, and the third catalyst material includes a third catalyst composition. At least one of the first, the second, and the third catalyst composition are different.

According to another embodiment, a fuel cell stack is disclosed. The fuel cell stack includes a first end region having a first number of fuel cell units. The first end region is connected to a first reactant inlet, and the first reactant inlet is connected to a first reactant source configured to provide a first reactant to the fuel cell stack. The first reactant source is a hydrogen source. At least one of the first number of fuel cell units is a first fuel cell unit including a membrane electrode assembly (MEA) with a first catalyst support on either or both an anode and a cathode of the first fuel cell unit, and the first catalyst support includes a first catalyst support material. The fuel cell stack also includes a second end region having a second number of fuel cell units, and the second end region is connected to a second reactant inlet. The second reactant inlet is connected to a second reactant source configured to provide a second reactant to the fuel cell stack. The second reactant source is an oxygen source. At least one of the second number of fuel cell units is a second fuel cell unit including an MEA with a second catalyst support on either or both an anode and a cathode of the second fuel cell unit, and the second catalyst support includes a second catalyst support material. The fuel cell stack further includes a middle region having a third number of fuel cell units. The middle region is situated between the first and the second end region. At least one of the third number of fuel cell units is an MEA with a third catalyst support on either or both an anode and a cathode of the third fuel cell unit, and the third catalyst support includes a third catalyst support material. At least one of the first, the second, and the third catalyst support material are different.

According to yet another embodiment, a fuel cell stack is disclosed. The fuel cell stack includes a first end region having a first number of fuel cell units. The first end region is connected to a first reactant inlet, and the first reactant inlet is connected to a first reactant source configured to provide a first reactant to the fuel cell stack. At least one of the first number of fuel cell units is a first fuel cell unit including a membrane electrode assembly (MEA) with a first ionomer-carbon ratio. The fuel cell stack also includes a second end region having a second number of fuel cell units, and the second end region is connected to a second reactant inlet. The second reactant inlet is connected to a second reactant source configured to provide a second reactant to the fuel cell stack. At least one of the second number of fuel cell units is a second fuel cell unit including an MEA with a second ionomer-carbon ratio. The fuel cell stack further includes a middle region having a third number of fuel cell units. The middle region is situated between the first and the second end region. At least one of the third number of fuel cell units is a third fuel cell unit including an MEA with a third ionomer-carbon ratio. At least one of the first, the second, and the third ionomer-carbon ratio are different.

BRIEF DESCRIPTION OF THE DRAWINGS

FIGS. 8A through 8F depict schematic views of Co-doped Pt catalyst layers for fuel cells.

FIGS. 9A through 9J depict schematic views of catalyst layers reacting with oxygen using DFT calculations.

FIG. 15 depicts a schematic perspective view of a fuel cell stack according to one or more embodiments.

DETAILED DESCRIPTION

Figure 1:
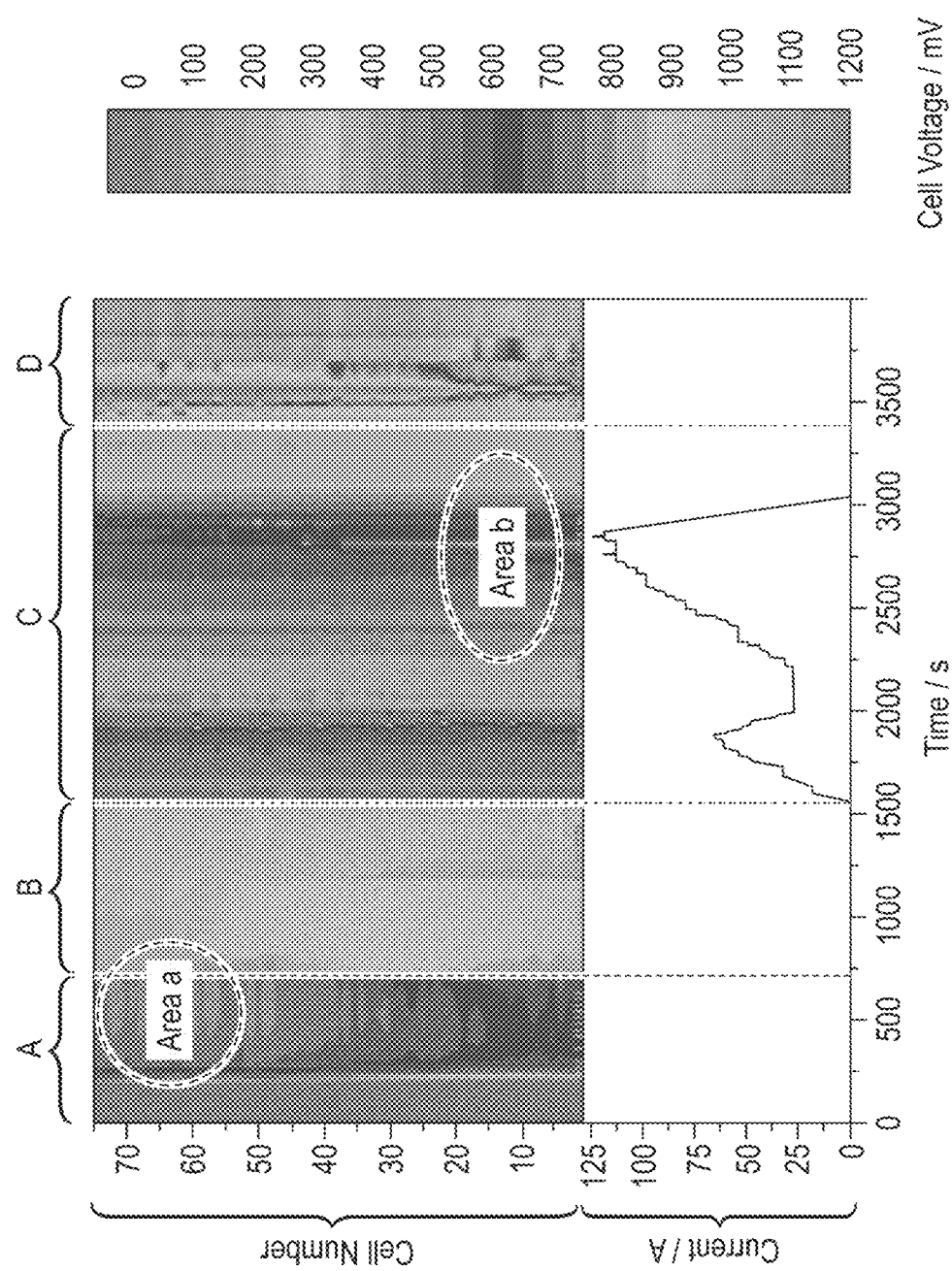
FIG. 1 depicts a diagram of cell voltages and current distributions in a proton exchange membrane fuel cell (PEMFC) stack during start-up/shutdown and steady-state operation.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the present disclosure implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and unless expressly stated to the contrary, measurement of a property is determined by the same technique as previously or later referenced for the same property.

This present disclosure is not limited to the specific embodiments and methods described below, as specific components and/or conditions may, of course, vary. Furthermore, the terminology used herein is used only for the purpose of describing embodiments of the present disclosure and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify any value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Due to rising carbon dioxide emissions and the relatively high current dependency on non-renewable fossil fuels as energy carriers in the transportation sector, there is an ever increasing need to develop and commercialize transportation technologies that use clean and sustainable sources of energy. One technology that possesses promise is a fuel cell, including polymer electrolyte membrane fuel cells (PEMFCs). A fuel cell uses oxygen from air and compressed hydrogen as fuel sources, while only emitting water and heat. The widespread adoption of fuel cells would reduce carbon dioxide emissions. However, widespread adoption requires further research into cost reductions for catalysts, such as platinum (Pt) catalysts, used in fuel cells.

A typical single fuel cell is composed of a polymer electrolyte membrane (PEM), an anode layer, a cathode layer and gas diffusion layers. These components form a membrane electrode assembly (MEA), which is surrounded by two flow-field plates. Out of all the MEA components, the catalyst, which is found in both the anode and cathode layers, is commonly the most expensive constituent, due to the necessity of using Pt at both the anode and cathode, and a lack of opportunity to reduce its cost through economics of scale effects. Pure Pt, Pt—Co and Pt—Ni nanoparticles have been used as catalyst compositions for commercial PEMFCs.

Pt catalysts are subject to dissolution and migration of $Pt^{2+}$ ions from the catalyst layer to other components, such as the polymer electrolyte membrane (PEM), in the fuel cell during following condition(s), but not limited to: high voltage operation, a start-up or shut-down stage, $H_2$ fuel starvation, and/or carbon corrosion. At the anode, Pt catalyzes a hydrogen oxidation reaction (HOR, $H_2 \rightarrow 2H^+ + 2e^-$); and at the cathode, Pt catalyzes the oxygen reduction reaction (ORR, $\frac{1}{2}O_2 + 2H^+ + 2e^- \rightarrow H_2O$). The required loading of Pt is significantly higher at the cathode than at the anode, because the kinetics of the ORR are significantly slower than the kinetics of the HOR. Furthermore, even when using a loading as low as 0.025 $mgPt/cm^2$ at the anode, the HOR can proceed with kinetic losses of less than 20 mV. Alternatively, even when using significantly higher loadings of platinum of 0.1 to 0.4 $mgPt/cm^2$, the ORR's kinetic penalty at currents relevant to operations of FCVs is approximately ~400 mV. During certain operating condition of the fuel cell, both at the anode and the cathode, Pt may undergo further degradation (e.g. dissolution, migration, and re-deposition that can lead to the loss in electrochemically-active surface area), which would then increase the kinetic overpotentials experienced by the entire PEMFC stack system throughout its lifetime.

Typically, any PEMFC stack may degrade over time due to a number of different possible factors (e.g. flooding, catalyst degradation, corrosion due to acidic environment, materials failure, overpotential build-up, pressure drop, etc.). Operating PEMFC at higher voltages greater than 0.8 V may produce more power for the stack system, however, it may cause the catalyst (and other components) to degrade more rapidly.

FIG. 1 depicts a diagram of cell voltages and current distributions in a PEMFC stack during start-up/shutdown and steady-state operation. The PEMFC stack has 70 individual fuel cell units. In FIG. 1, Section A represents a partial start-up stage of the PEMFC stack; Section B represents a full start-up stage of the PEMFC stack; Section C represents a normal operation stage of the PEMFC stack; and Section D represents a shutdown stage of the PEMFC stack. As shown in FIG. 1, cell voltages of individual fuel cell units in the PEMFC stack are different based on locations of individual fuel cell units in the PEMFC stack, especially during a start-up/shutdown procedure. Specifically, during the start-up procedure, cell voltages near a gas inlet of the PEMFC stack, as shown in Area a, are around 0.8 V, which are much higher than cell voltages of fuel cell units positioned at other locations in the PEMFC stack (0.5 to 0.75 V). In addition, during a steady-state operation of the PEMFC stack, cell voltages of individual fuel cell units also vary at different locations in the PEMFC stack. If pooling of a liquid (e.g. water flooding) occurs, as shown in Area b, cell voltages of affected fuel cell units are significantly higher than other fuel cell units in the PEMFC stack. Furthermore, cell voltages of individual fuel cell units in the PEMFC stack may abruptly change when severe catalyst degradation occurs toward or near the end of life of individual fuel cell units, $H_2$ fuel starvation, carbon corrosion, acceleration, deceleration, etc.

In light of the foregoing, there is a need to reduce dissolution and slow down migration while maintaining the catalytic activity of the Pt catalysts in a fuel cell stack. Aspects of the present disclosure are directed to variations of catalyst materials based on locations of individual fuel cell units in a fuel cell stack. In one embodiment, catalyst compositions of individual fuel cell units are different based on locations of the individual fuel cell units in the fuel cell stack. In another embodiment, catalyst loadings of individual fuel cell units are different based on locations of the individual fuel cell units in the fuel cell stack. In another embodiment, catalyst crystal facet distributions of individual fuel cell units are different based on locations of the individual fuel cell units in the fuel cell stack. In yet another embodiment, catalyst support materials of individual fuel cell units are different based on locations of the individual fuel cell units in the fuel cell stack. In yet another embodiment, electrode thicknesses of individual fuel cell units are different based on locations of the individual fuel cell units in the fuel cell stack. In still another embodiment, ionomer-carbon ratios as well as ionomer compositions of individual fuel cell units are different based on locations of the individual fuel cell units in the fuel cell stack.

Further, two or more of the above embodiments may be combined. For example, a first fuel cell unit in the fuel cell stack has a first catalyst composition with a first catalyst loading, and a second fuel cell unit in the fuel cell stack has a second catalyst composition with a second catalyst loading. Not only may the first and second catalyst compositions be different, but the first and second catalyst loadings may also be different. Further, suppose that the first fuel cell unit has a first catalyst crystal facet distribution, and that the second fuel cell unit has a second catalyst crystal facet distribution. In addition to the first and second catalyst compositions and/or loadings being different, the first and second catalyst crystal facet distributions may also be different based on locations of the first and second fuel cell units in the fuel cell stack.

Figure 2:
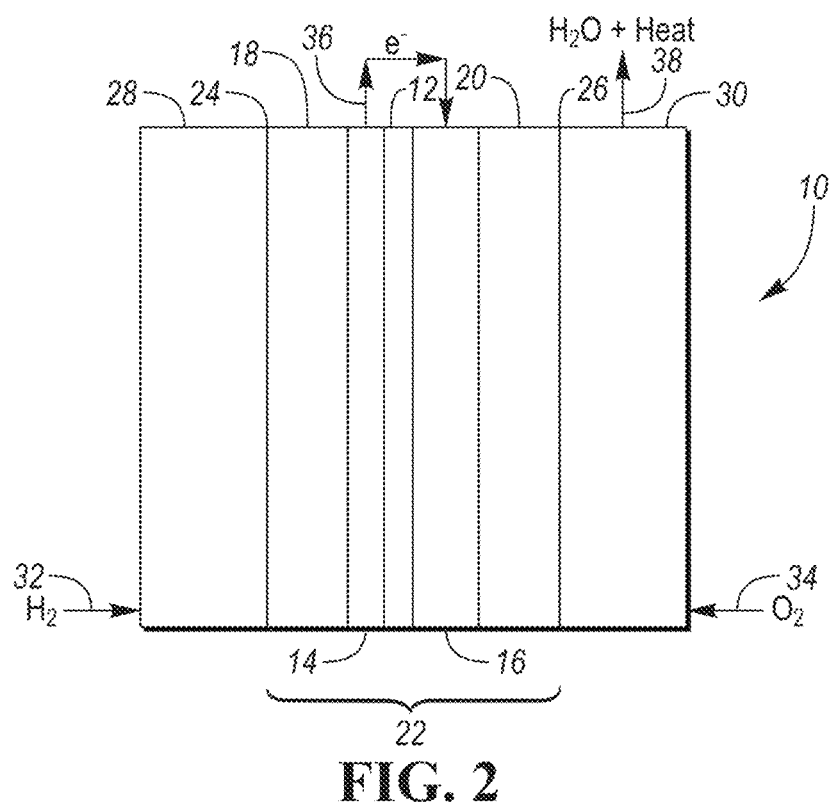
FIG. 2 depicts a schematic side view of fuel cell unit.

FIG. 2 depicts a schematic side view of fuel cell unit 10. Fuel cell unit 10 can be stacked to create a fuel cell stack assembly. Fuel cell unit 10 includes polymer electrolyte membrane (PEM) 12, anode layer 14, cathode layer 16 and first and second gas diffusion layers (GDLs) 18 and 20. PEM 12 is situated between anode layer 14 and cathode layer 16. Anode layer 14 is situated between first GDL 18 and PEM 12, and cathode layer 16 is situated between second GDL 20 and PEM 12. PEM 12, anode 14, cathode 16 and first and second GDLs 18 and 20 comprise membrane electrode assembly (MEA) 22. First and second sides 24 and 26 of MEA 22 is bounded by flow fields 28 and 30, respectively. Flow field 28 supplies $H_2$ to MEA 22, as signified by arrow 32. Flow field 30 supplies $O_2$ to MEA 22, as signified by arrow 34. A catalyst material, such as platinum (Pt), is used in anode layer 14 and cathode layer 16. The catalyst material is commonly the most expensive constituent of MEA 22. The catalyst material is supported on a catalyst support, typically made of carbon and/or metal oxides.

Figure 3A:
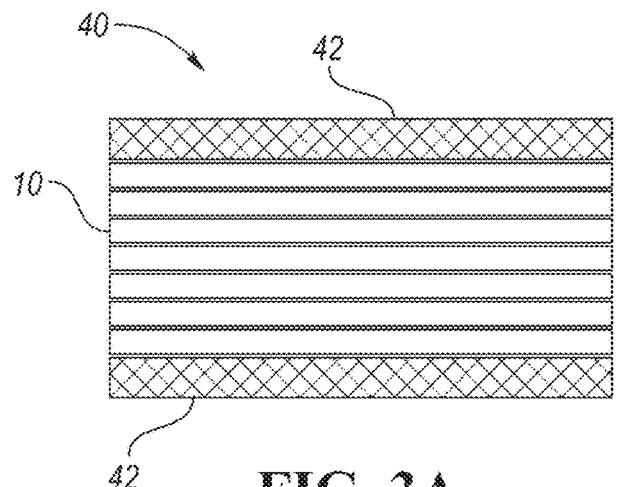
FIG. 3A is a schematic side view of a fuel cell stack, including several fuel cell units.
Figure 3B:
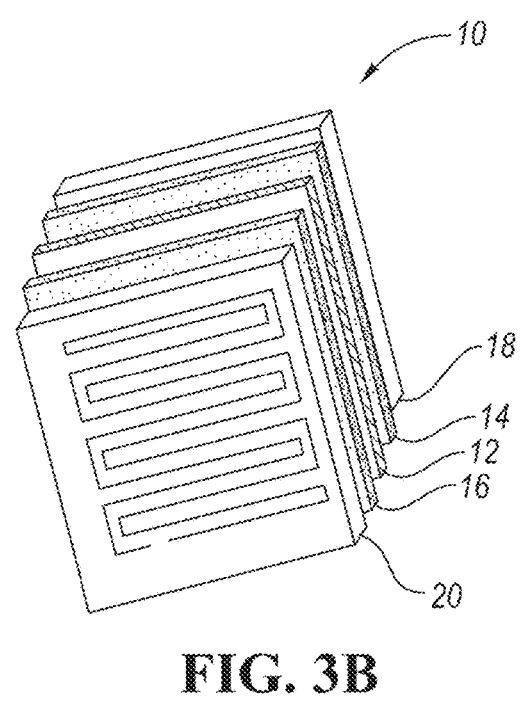
FIG. 3B is a schematic perspective view of a fuel cell unit.

FIG. 3A is a schematic side view of a fuel cell stack assembly 40, including several fuel cell units. Fuel cell stack 40 may be connected to an external circuit to provide power. Fuel cell stack 40 generally comprises a number of fuel cell units 10 arranged between two fuel cell stack end plates 42. FIG. 3B is a schematic perspective view of a fuel cell unit 10. As shown in FIG. 3B, fuel cell unit 10 may include anode layer 14 and cathode layer 16, and a PEM 12 situated between anode layer 14 and cathode layer 16. Fuel cell unit 10 may further include first and second GDLs 18 and 20.

In one embodiment, first-principles density functional theory (DFT) algorithms, calculations and/or methodologies are used to determine a thermodynamic reaction pathway of an ORR occurring at a catalyst surface. The DFT algorithms may be used to model an adsorbed oxygen atom on a Pt catalyst and its reduction to —OH and reaction with another $H^+$ (or $H_3O^+$), which may generate a water molecule ($H_2O$). The modelling accounts for the strength of the chemical and/or physical bonding for each adsorbate (—H, —OH, —O, and $H_2O$), and how it may affect catalytic activity and stability.

Figure 4:
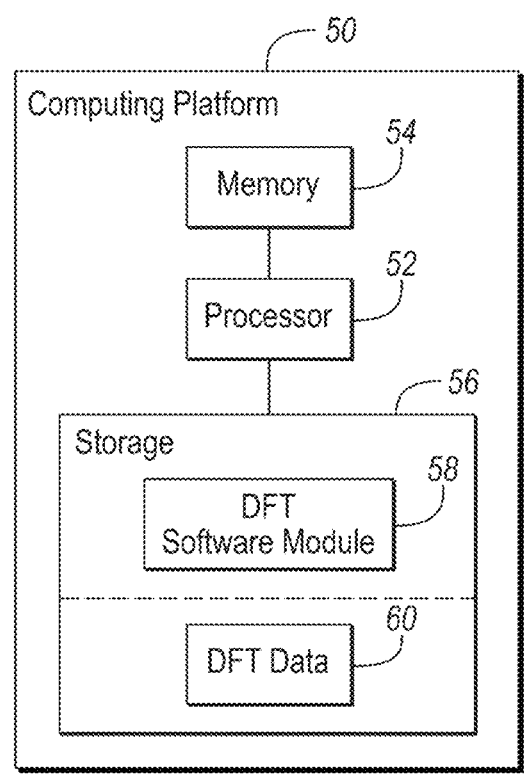
FIG. 4 is a schematic diagram of a computing platform that may be utilized to implement density functional theory (DFT) algorithms, calculations and/or methodologies of one or more embodiments.

The DFT algorithms, calculations and/or methodologies of one or more embodiments are implemented using a computer platform, such as the computing platform 50 illustrated in FIG. 4. The computing platform 50 may include a processor 52, memory 54, and non-volatile storage 56. The processor 52 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 54. The memory 54 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 56 may include one or more persistent data storage devices such as a hard drive, optical drive, tape drive, non-volatile solid-state device, cloud storage or any other device capable of persistently storing information.

Processor 52 may be configured to read into memory 54 and execute computer-executable instructions residing in DFT software module 58 of the non-volatile storage 56 and embodying DFT slab model algorithms, calculations and/or methodologies of one or more embodiments. Software module 58 may include operating systems and applications. Software module 58 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 52, the computer-executable instructions of the DFT software module 58 may cause the computing platform 50 to implement one or more of the DFT algorithms and/or methodologies disclosed herein. Non-volatile storage 56 may also include DFT data 60 supporting the functions, features, calculations, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

Figure 5A:
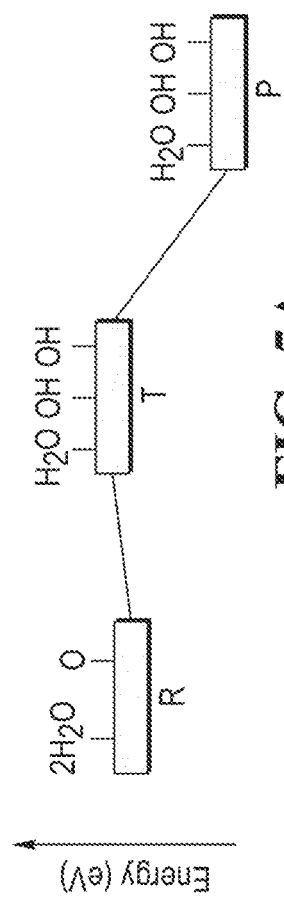
FIGS. 5A and 5B depict schematic views of a thermodynamic reaction pathway of an oxygen reduction reaction (ORR) on a Pt(111) catalyst surface.
Figure 5B:
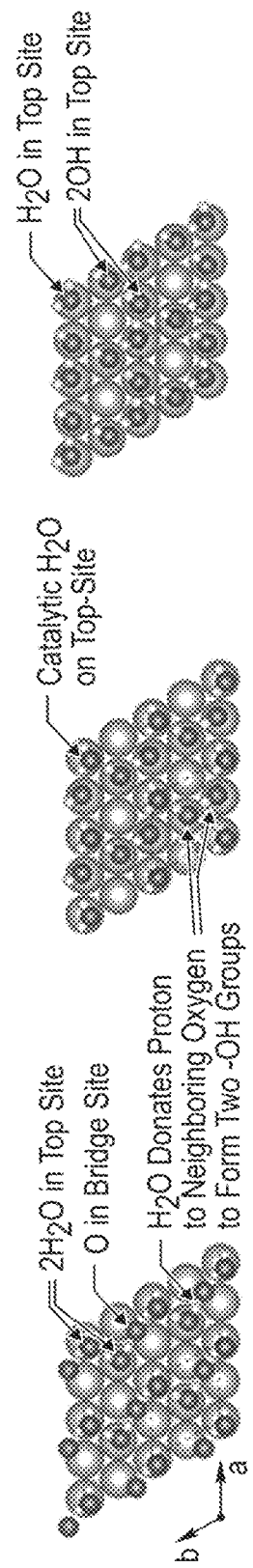

As generated by DFT software module 58, FIGS. 5A and 5B depict schematic views of a thermodynamic reaction pathway of an ORR on a Pt(111) catalyst surface. As shown in FIG. 5A, an oxygen on Pt is accompanied by two $H_2O$ molecules at an initial state R. One $H_2O$ molecule dissociates and provides a hydrogen to a neighboring oxygen, resulting in a transition state T that has two —OH groups bound to the Pt(111) catalyst surface. The other $H_2O$ molecule does not directly participate in the ORR reaction but plays a catalytic role during the reaction. The final state P is where the two —OH groups are located on top sites of the Pt(111) catalyst surface. Thereafter, one of the two —OH groups can further react with another $H^+$ (or $H_3O^+$) to generate one $H_2O$ molecule.

Depending on the availability of adsorbate species (e.g. $H^+$, $OH^-$, $O^{2-}$, $H_2O$, $H_3O^+$), pH levels, flow rates of reactant gases, humidity, currents, and/or voltages, the rate of the ORR may be significantly affected based on catalyst materials. In addition, the strength of chemical and/or physical bonding for each adsorbate may be significantly different based on catalyst materials. In one embodiment, catalyst materials may be different in composition (e.g. Pt vs. $Pt_3Co$). In another embodiment, the size or the shape of catalyst nanoparticles may be different (e.g. 3 nm vs. 7 nm Pt nanoparticles, or a truncated-octahedron shape vs. a spherical shape Pt nanoparticles).

Figure 6:
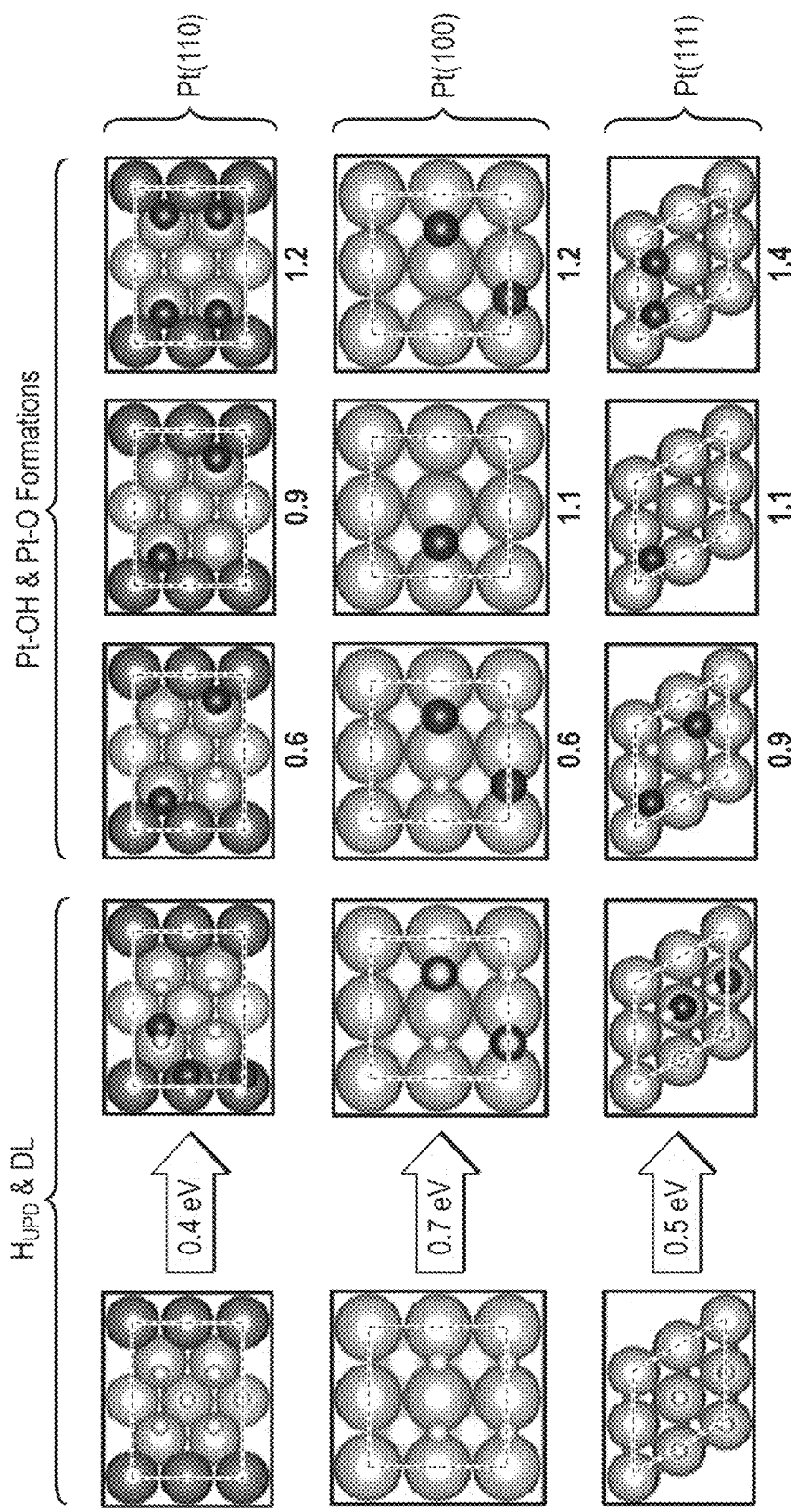
FIG. 6 depicts a schematic view of formation energies (e.g. voltages) of —H, —OH, and —O on Pt(110), Pt(100), and Pt(111) catalyst surfaces.

As generated by DFT software module 58, FIG. 6 depicts a schematic view of formation energies (e.g. voltages) of —H, —OH, and —O on Pt(110), Pt(100), and Pt(111) catalyst surfaces. ½$H_2$(g) and one $H_2O$ molecule are used on Pt(111) catalyst surface as a reference. As shown in FIG. 6, different energies are required for hydrogen desorption from the above catalyst surfaces. Specifically, the required hydrogen underpotential desorption ($H_{UPD}$) energies at double layer (DL) regions for Pt(110), Pt(100), and Pt(111) are 0.4, 0.7, and 0.5 eV, respectively. In addition, FIG. 6 illustrates that the formations of Pt—OH and Pt—O on Pt(110) and Pt(100) catalyst surfaces require relatively less energies than the formations of Pt—OH and Pt—O on Pt(111) catalyst surface. This phenomenon indicates that Pt(110) and Pt(100) catalyst surfaces may be more catalytically active for the ORR reaction, but may degrade much easily and lead to $Pt^{2+}$ dissolution during the ORR reaction. On the other hand, since Pt(111) catalyst surface may be less catalytically active than Pt(110) and Pt(100) catalyst surfaces, the durability of Pt(111) catalyst surface may be superior compared to Pt(110) and Pt(100) catalyst surfaces.

Figure 7A:
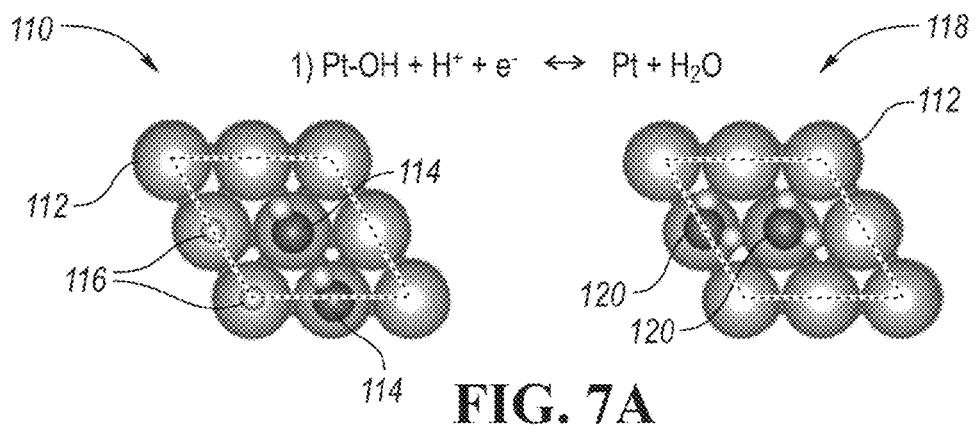
FIG. 7A through 7F depict schematic views of different catalyst layer structures for fuel cells.
Figure 7B:
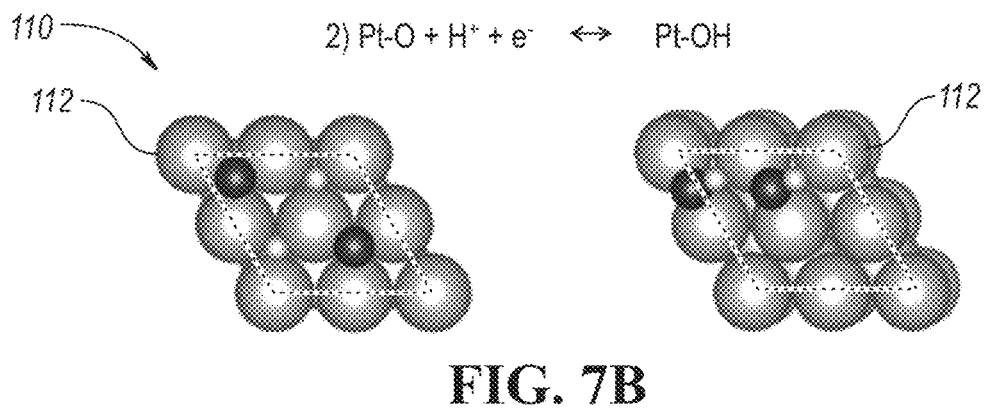
Figures 7C, 7D, 7E, 7F:
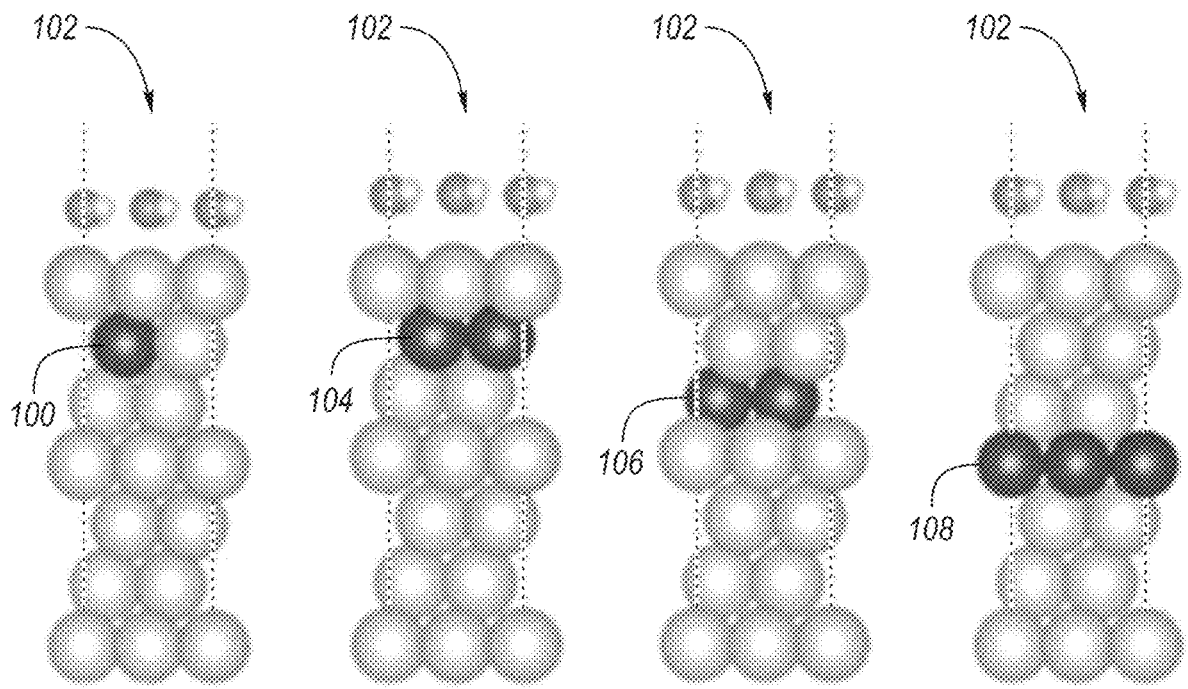

FIGS. 7A through 7F depict schematic views of different catalyst layers and the effect of Co doping and substitution on Pt catalyst on an ORR reaction (i.e. potential of a fuel cell). As shown by the DFT calculations, different chemical doping and/or substitution may significantly affect catalyst activity. The DFT software module 58 calculates results on an ORR reaction occurring at pure Pt and Pt—Co catalyst materials, where the Co atoms are located in various sites within a Pt(111) catalyst slab. FIG. 7C depicts Co atoms located at site 100 of Pt(111) catalyst slab 102. FIG. 7D depicts Co atoms located at sites 104 of Pt(111) catalyst slab 102. FIG. 7E depicts Co atoms located at sites 106 of Pt(111) catalyst slab 102. FIG. 7F depicts Co atoms located at sites 108 of Pt(111) catalyst slab 102. As shown in FIG. 7A, the DFT calculations demonstrate the reaction below takes place at 0.74 V versus reversible hydrogen electrode (RHE) in pure Pt.

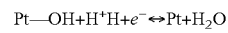  (1)

Catalyst layer 110 depicts the reactant side of reaction (1) including Pt atoms 112, hydroxide ions 114 and hydrogen ions 116. Catalyst layer 118 depicts the produce side of reaction (1) including Pt atoms 112 and $H_2O$ molecules 120. As shown in FIG. 7B, the DFT calculations demonstrate the reaction below takes place at 0.95 V versus reversible hydrogen electrode (RHE) in pure Pt.

$$Pt\text{—}O + H^+ + e^- \Leftrightarrow Pt\text{—}OH \quad (2)$$

According to the DFT calculations, when Co is substituted at site 100 or site 104, which are in the subsurface of the Pt(111) catalyst slab 102, the potentials of reactions (1) and (2) are increased. According to the DFT calculations, when Co is substituted at sites 106 and 108, which are located toward the bulk, the Co imparts less of an effect. For instance, Co situated at sites 106 shows a similar potential as Co situated at site 100, even though the concentration of Co in the Pt catalyst is different. In the case of Co situated at sites 108, the effect is negligible in comparison to pure Pt. Since Co situated at sites 108 leads to the same potential as Co situated at sites 106, pure Pt catalyst may be replaceable with Pt—Co alloys, where three layers of Pt are situated on top of Co metals (e.g. Pt shell and Co core). In such embodiments, the catalyst material including Co may save Pt loading and cost, while providing the same performance as compared with pure Pt. Table 1 set forth below shows the reaction potentials for each type of Pt(111) catalyst (with and without Co):

TABLE 1

| Catalyst | Reaction (1) | Reaction (2) | Standard potential |
|---|---|---|---|
| Pure Pt(111) | 0.74 V | 0.95 V | Agrees well with experiment |
| Co-doping subsurface (i.e. 100) | 0.84 V | 0.98 V | 0.1 V increase from reaction (1) |
| Co-substitution (i.e. 104) | 1.07 V | 1.29 V | −0.3 V increase from reactions (1) and (2) |
| Co-substitution (i.e. 106) | 0.84 V | 0.97 V | Similar to (1) |
| Co-substitution (i.e. 108) | 0.72 V | 0.93 V | Similar to pure Pt |

Depending on catalyst crystal facet distribution, concentration of one or more alloying elements, and alloy distribution (e.g. surface, subsurface or toward bulk) within a Pt catalyst, the catalytic activity as well as the stability may be significantly influenced. The surface layer may be the outermost top surface layer. The subsurface layer may be one layer directly below the surface layer. Bulk layers may be the layers below the surface and subsurface layers. In other embodiments, the surface and subsurface layers may be the first three layers as the surface may not be pristine.

As generated by DFT software module 58, FIGS. 8A through 8F depict Co-doped Pt catalyst layers 150, 152, 154, 154, 156, 158 and 160, respectively. Catalyst model 150 includes doped Co at surface sites 162. Catalyst model 152 includes doped Co at subsurface site 164. Catalyst model 154 includes doped Co at a third layer site 166. Catalyst model 156 includes doped Co at a fourth layer site 168. Catalyst model 158 includes doped Co at a fifth layer site 170. Catalyst model 160 includes doped Co in a bulk region 172. In another embodiment, the Co doping may be replaced with Ni doping. Table 2 below reports the doping energy ($\Delta E_{doping}$) [eV/Site] for Co and Ni using calculated DFT values.

TABLE 2

| $\Delta E_{doping}$ [eV/Site] | Ni Doping | Co Doping |
|---|---|---|
| Surface | 0.226 | 0.580 |
| Subsurface | −0.306 | −0.001 |
| Third Layer | −0.257 | 0.037 |
| Fourth Layer | −0.267 | 0.043 |
| Fifth Layer | −0.239 | 0.054 |
| Bulk | −0.148 | 0.138 |

From the DFT calculated data, it is observed that the calculated doping energy ($\Delta E_{doping}$) for Ni is generally more negative compared to Co-doped Pt system. Where the crystal structure of Ni and Pt are similar, both being face-centered cubic (fcc), Co has a ground state of being hexagonal closed packed (hcp) structure. Mixing may be more easily induced when crystal structure, size, and/or electronic valence are similar. The DFT calculated data also supports that it may be harder to segregate Ni atoms at the subsurface region of the Pt catalyst due to the strong mixing of Ni and Pt. When the calculated $\Delta E_{doping}$ is less than zero, mixing is induced favorably. The DFT calculated results also indicate that Co rather segregates at the subsurface of Pt(111), while Ni can be mixed throughout the Pt (except at the surface of Pt). As shown in Table 2, the relatively high positive values for Ni and Co doping at the surface demonstrates the least favorable for Ni and Co to segregate out toward Pt surface. Table 2 also shows that it is most favorable for the Ni and Co to occupy the subsurface. The doping in further layers down trend toward bulk values.

FIGS. 9A though 9J depict catalyst layers 200, 202, 204, 206, 208, 210, 212, 214, 216 and 218, reacting with oxygen using DFT calculations, respectively. Catalyst layer 200 is a pure Pt(111) material with a bound oxygen atom 220 at the surface. Catalyst layer 202 includes an Ni doping 222 and a bound oxygen 224 at the surface. Catalyst layer 204 includes Ni atoms at a subsurface region 226 and a bound oxygen 228 at the surface. Catalyst layer 206 includes a Co doping 230 and a bound oxygen 232 at the surface. Catalyst layer 208 includes Co atoms at a subsurface region 234 and a bound oxygen 236 at the surface. Catalyst layer 210 is a pure Pt(111) material with bound oxygen atoms 238 at subsurface region. Catalyst layer 212 includes an Ni doping 240 and bound oxygens 242 at a subsurface region. Catalyst layer 214 includes Ni atoms at a subsurface region 244 and bound oxygens 246 at a subsurface region. Catalyst 216 includes a Co doping 248 and bound oxygens 250 at a subsurface region. Catalyst 218 includes Co atoms a subsurface region 252 and bound oxygens 254 at the subsurface region 252. Table 3 shows the calculated DFT oxygen binding energies ($\Delta E_{binding,O}$) for the depicted pure Pt, Pt—Ni, and Pt—Co systems.

TABLE 3

| $\Delta E_{doping}$ [eV/O] | Surface | Subsurface |
|---|---|---|
| Pt(111) | −1.664 | +1.374 |
| Ni-doped | −1.189 | +0.555 |
| Ni-subsurface | −1.100 | −0.407 |
| Co-doped | −1.146 | +0.285 |
| Co-subsurface | −1.055 | −0.992 |

Depending on the composition of the catalyst, oxygen binding energies may be affected dramatically, leading to different catalytic activities and degradation. The $\Delta E_{binding,O}$ on pure Pt(111) surface is −1.664 eV, whereas $\Delta E_{binding,O}$ of Ni- and Co-doped/-substituted Pt(111) vary from −1.0 to −1.2 eV. The increase in oxygen binding energies indicates that once the oxygen atom is adsorbed at the catalyst surface, they may be also desorbed more easily, leading to increase in the catalytic activities (forming $H_2O$ more easily). The $\Delta E_{binding,O}$ on pure Pt(111) subsurface is +1.374 eV, which indicates that it takes a significant amount of energy for oxygen to penetrate and form at the subsurface. However, once either Co and Ni doping and substitution take place at the Pt catalyst, $\Delta E_{binding,O}$ decreases significantly. This indicates that substrate oxide formation may become more favorable where Pt and Co/Ni dissolution steps are triggered more easily, especially at the high operating potential of PEMFCs. While Ni and Co doping and substitution in Pt may enhance the catalytic activity, the stability of Pt-M catalyst is not as favorable, compared to pure Pt catalyst. In one or more embodiments, catalytic activity (i.e. PEMFC performance), catalytic stability (i.e. PEMFC lifetime) and catalyst cost are concurrently optimized.

Figure 10A:
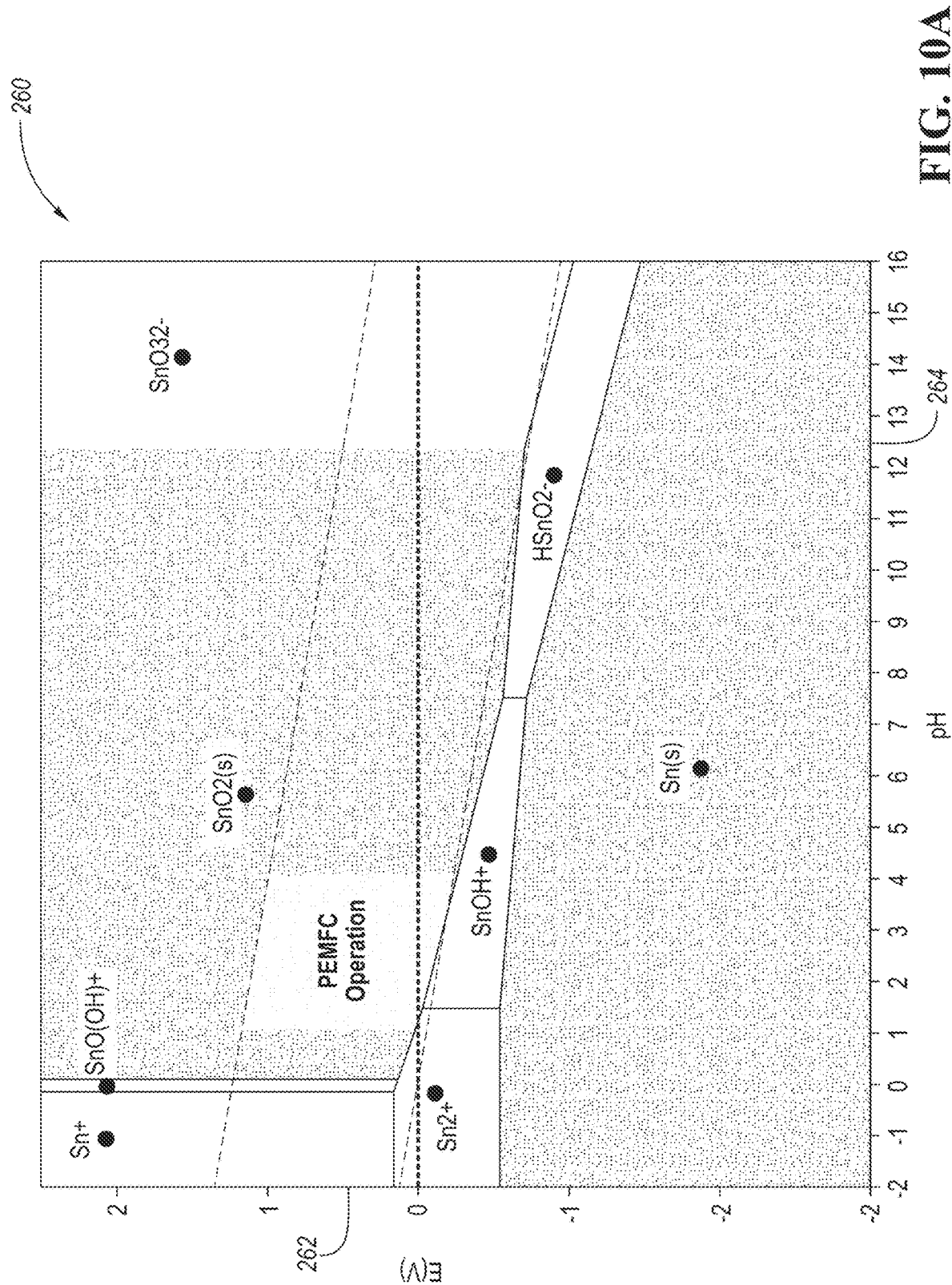
FIG. 10A depicts a Pourbaix diagram showing a graphical presentation of the thermodynamic equilibrium states of a metal (tin) as a function of different acidities and voltages.

FIG. 10A depicts a Pourbaix diagram 260 showing a graphical presentation of the thermodynamic equilibrium states of a tin (Sn) as a function of different acidities and voltages. Pourbaix diagram 260 plots electrode potential of tin (Sn) in E(V) 262 versus pH 264 of the electrolyte. The Pourbaix diagram 260 shows that Sn will passivate to $SnO_2$ when pH varies from 1 to 4 and voltage fluctuates from 0 to 1 V (identifying an operating regime relevant to PEMFC operation). Except for Co, Ni, and Re, other elements (W, Mo, Ge, Sn, Nb, Ta, and Ti) may form an oxide at this region: e.g. $WO_{3-x}$, $MoO_{3-x}$, $GeO_{2-x}$, $SnO_{2-x}$, $Nb_2O_{5-y}$, $Ta_2O_{5-y}$, and $TiO_{2-x}$ (where $0 \leq x \leq 2$ and $0 \leq y \leq 5$). Co, Ni, and Re will likely become $Co^{2+}$, $Ni^{2+}$, and $ReO^{4-}$, in this PEMFC operation regime, according to each experimental Pourbaix diagram.

Figure 10B:
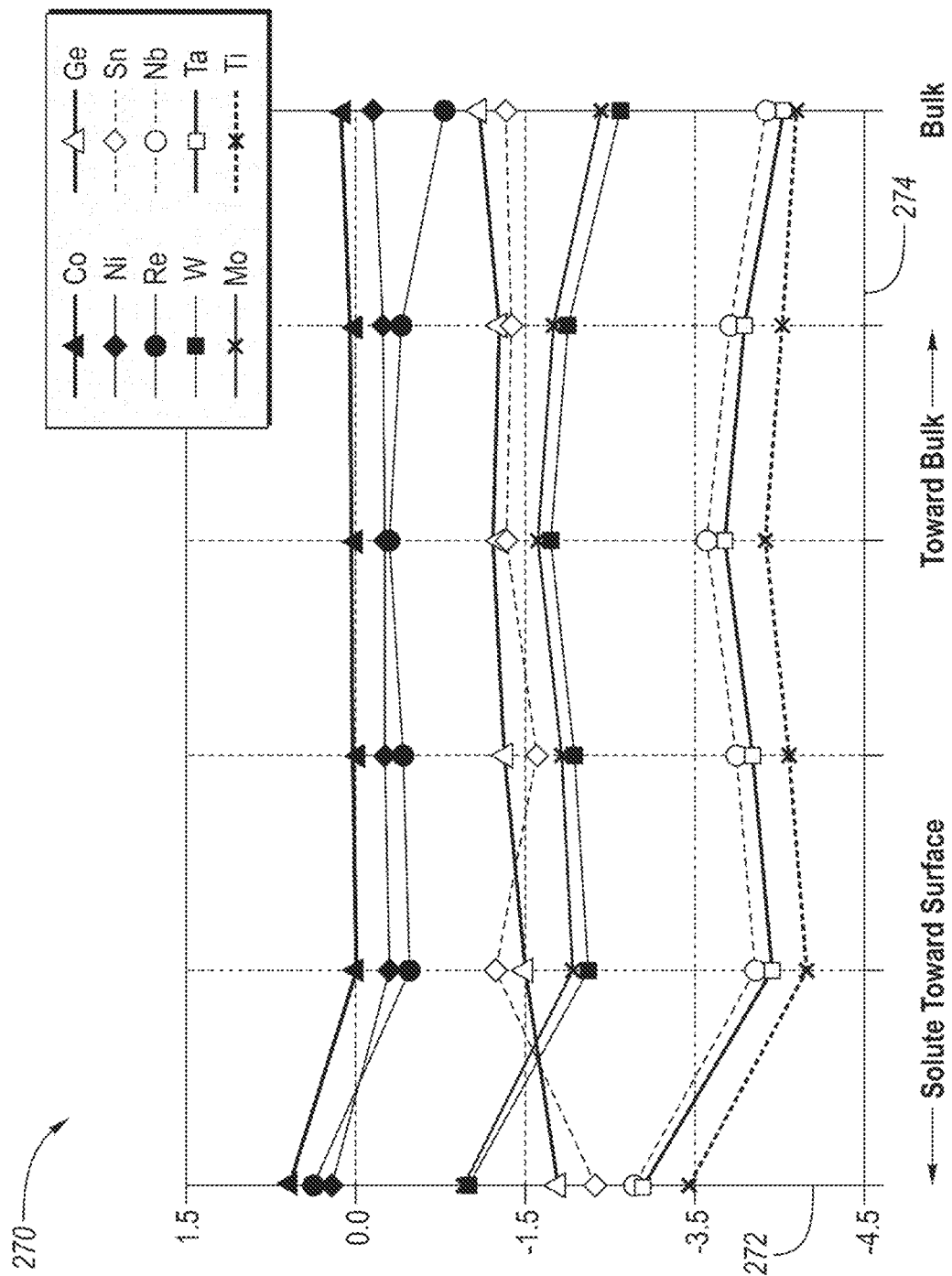
FIG. 10B depicts a graph showing calculated DFT results for ten different metals (M equals cobalt (Co), nickel (Ni), rhenium (Re), tungsten (W), molybdenum (Mo), germanium (Ge), tin (Sn), niobium (Nb), tantalum (Ta), and titanium (Ti)) embedded in Pt-M catalyst at various locations within a catalyst layer.

FIG. 10B depicts a graph 270 showing calculated DFT results for ten different metals (M equals Co, Ni, rhenium (Re), tungsten (W), molybdenum (Mo), germanium (Ge), tin (Sn), niobium (Nb), tantalum (Ta), and titanium (Ti)) embedded in Pt-M catalyst at various locations within a catalyst layer. Graph 270 shows segregation tendency of Pt-M by plotting mixing energy [eV/Site] as the y-axis 272 versus distance from the catalyst layer surface as the x-axis 274. The lowest mixing energy for each metal is the lowest point on each metal curve. Generally, positive values of DFT mixing energies indicate phase generation and negative values indicate mixing can be induced. The magnitude of mixing energies determines the strength or weakness of the mixing. For example, Ti and Pt mixes more strongly than Ni and Pt. Here, Co, Ni and Re may ionize to $Co^{2+}$, $Ni^{2+}$, $ReO_4^-$, if directly exposed to PEFMC environment. The other elements are likely to be passivate, i.e., form a stable oxide $MO_x$, during PEMFC operating regime.

As shown by the DFT calculations previously reported herein, Co and Ni have the strongest preference in the subsurface region. While the mixing energy is generally positive for Co (due to difference in its crystal structure), Ni prefers to mix with Pt (i.e., mixing energy is slightly below zero) due to similarity in its crystal structure. Re also has a similar magnitude of mixing energies with Co and Ni, however, it mostly prefers to mix at the bulk scale. The other elements listed in FIG. 10B mix relatively very strongly (i.e., very negative mixing energies), when compared with Ni, Co, and Re. W and Mo having the similar trends, where bulk mixing with Pt is most preferred. Ge and Sn share the same trends, where surface mixing is mostly preferred (while the overall mixing energies are quite negative). Nb and Ta mix strongly at the bulk, while Ti prefers to stay at the subsurface.

As supported by FIG. 10B, a different element M in Pt-M may lead to different segregation within the catalyst materials, all leading to distinct catalytic activities and stabilities. For example, both Co and Ni can increase the catalytic activity; however, Pt—Co and Pt—Ni could lead to a faster degradation due to favorable subsurface oxide formation as well as their tendencies to be ionized to $Co^{2+}$ and $Ni^{2+}$ during the PEMFC operation, once exposed at the surface. FIG. 10B shows a DFT calculations on Pt—Sn, where Sn likes to segregate toward the surface. While the oxygen binding energy at Pt—Sn is increased (not as much as Pt—Co or Pt—Sn), this increases the catalytic activity to form $H_2O$ more easily during PEMFC operation. At the same time, Sn only passivates to $SnO_2$, but is unlikely to dissolve easily, when to compare with $Co^{2+}$ or $Ni^{2+}$ systems.

Although using Pt-M alloys (M is a metal element) as catalysts rather than pure Pt reduces the cost for manufacturing a fuel cell unit, metal leaching may occur when metal M is exposed to the acidic environment in the fuel cell unit. Formation of a catalyst skin made of pure Pt or a close composition to pure Pt may protect Pt-M alloys, and thereby extending the lifetime of the fuel cell unit.

Figure 11:
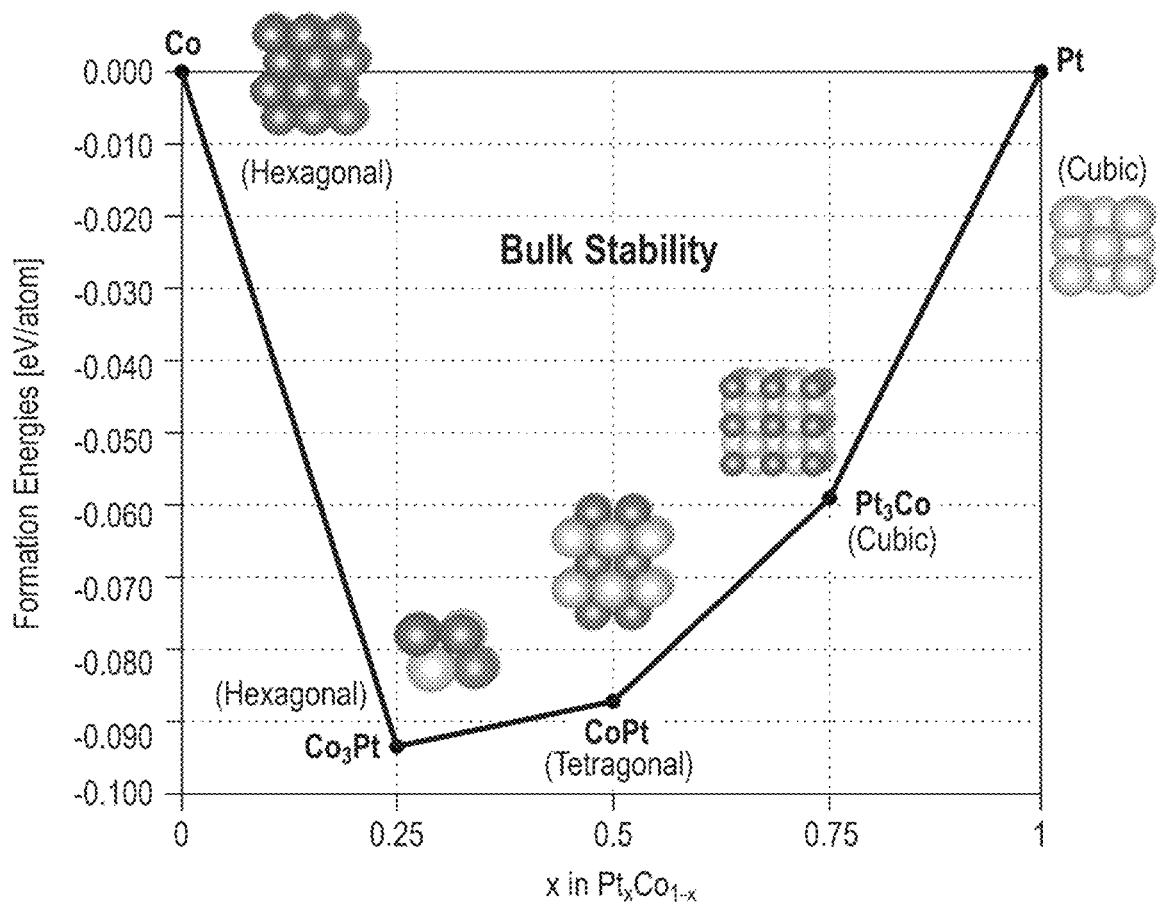
FIG. 11 depicts a Pt—Co phase graph showing formation energies of Pt—Co alloys as a function of the concentration of Pt in a Pt—Co alloy.

FIG. 11 depicts a Pt—Co phase graph showing formation energies of Pt—Co alloys as a function of the concentration of Pt in a Pt—Co alloy. As shown in FIG. 11, the structural geometry of both Pt and $Pt_3Co$ is cubic, where the concentration of Pt is at least 75%. However, when the concentration of Pt in Pt—Co alloys is less than 75%, a structural phase transition may occur. For example, if the concentration of Pt in Pt—Co alloys is reduced to 50%, the structural geometry of PtCo is tetragonal; and if the concentration of Pt in Pt—Co alloys is further reduced to 25%, $PtCo_3$ is hexagonal. Therefore, to maintain catalytic activity and reduce catalyst degradation, the concentration of Pt may be desirable to be at least 75% in Pt—Co alloys. In fact, Pt—Co catalysts that have been adopted in manufacturing fuel cells normally include a Co concentration varying from 5 to 20%, with an average mol % of Co being around 16%. In some cases, the concentration of Pt in Pt—Co alloys can be less than 75%, such as between 25 and 50% or between 50 and 75%, when the fuel cell electrodes are designed to accommodate different structure phase transitions (e.g. cubic to tetragonal to hexagonal, or vice versa). This may be achieved by, but not limited to, increasing a higher carbon ratio, creating void spaces, or modifying foam-type support.

Figure 12A:
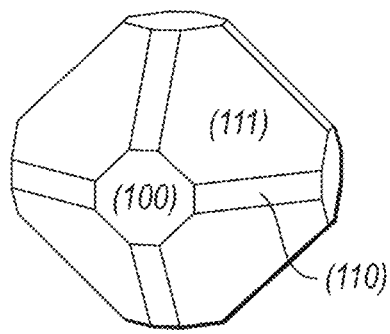
FIG. 12A depicts surface energies of (111), (110) and (100) facets in pure Pt calculated by DFT simulations.

FIG. 12A depicts surface energies of (111), (110) and (100) facets in pure Pt calculated by DFT simulations. For pristine Pt, the surface energies of (111), (110) and (100) facets are 1.50 $J/m^2$, 1.82 $J/m^2$, and 1.95 $J/m^2$, respectively. FIG. 12A also shows that both (111) and (100) surfaces are flat, and (110) surface tends to reconstruct with a missing Pt row, denoted as R-(110). In addition, the thermodynamic equilibrium particle of pure Pt is in a Wulff shape (i.e., a truncated octahedron), where Pt(111) is the most dominant facet, with about 63.6% surface area, and facets R-(110) and (100) make up the edges and the corners of the Pt particle, with surface areas of about 14.9% and 21.5%, respectively.

Figure 12B:
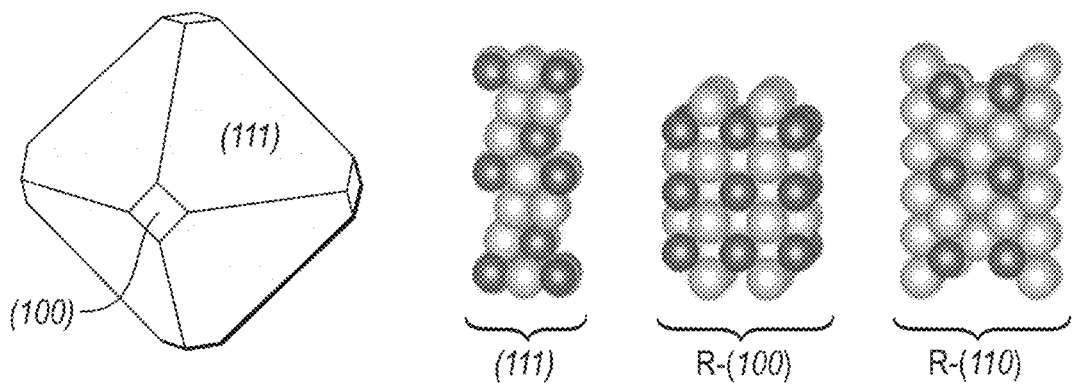
FIG. 12B depicts surface energies of (111), (110) and (100) facets in $Pt_3Co$ calculated by DFT simulations.

FIG. 12B depicts surface energies of (111), (110) and (100) facets in $Pt_3Co$ calculated by DFT simulations. For $Pt_3Co$, the surface energies of (111), (110) and (100) facets are 1.79 $J/m^2$, 2.29 $J/m^2$, and 2.62 $J/m^2$, respectively. FIG. 12B shows that both (110) and (100) surfaces are reconstructed (i.e., surfaces are not flat) with missing atom(s). In addition, the Wulff shape of $Pt_3Co$ in FIG. 12B is different from that of pure Pt in FIG. 12A. The surface area of (100) in $Pt_3Co$ decreases significantly, and the surface area of (111) is the most dominant facet for $Pt_3Co$ (~95% of the entire surface area).

As shown in FIGS. 12A and 12B, the surface areas of (110) and (100) appear to decrease in $Pt_3Co$ compared to pure Pt. As discussed in FIG. 6, (110) and (100) facets are more catalytically robust for an ORR reaction than (111) facet for pure Pt; and (111) facet is more durable than (110) and (100) facets in pure Pt. In other words, the catalytic activity of (111)-dominated Pt catalyst may be slightly reduced compared to that of a Pt catalyst containing more of (110) and (100) facets. In addition, although $Pt_3Co$ has increased (111) facet which may extend the lifetime of a fuel cell unit, exposed Co at the $Pt_3Co$ surface may still be problematic against metal leaching and dissolution in highly acidic PEMFC environment.

Figure 13:
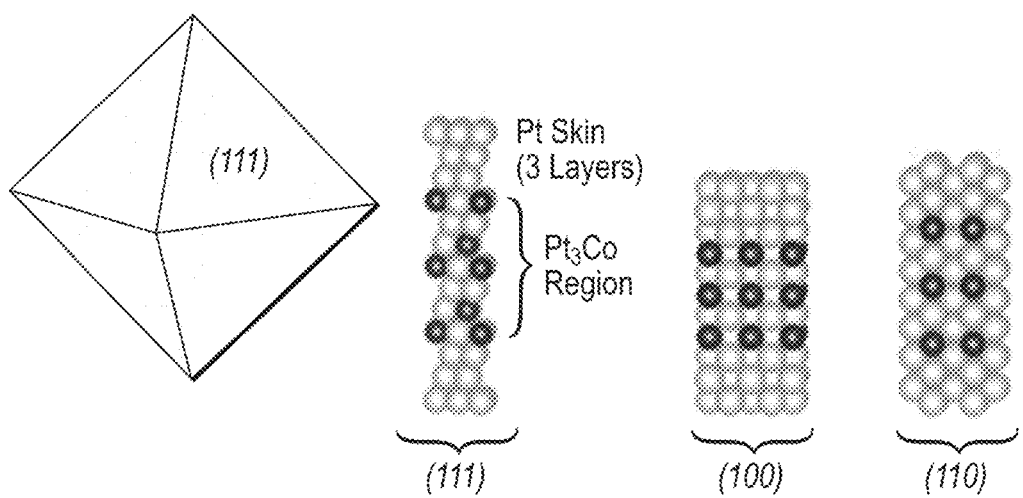
FIG. 13 depicts surface energies of (111), (110) and (100) facets of $Pt_3Co$ with additional layers (e.g. three layers) of Pt catalyst skin calculated by DFT simulations.

Therefore, to protect a Pt-M alloy catalyst, such as $Pt_3Co$, a catalyst skin of pure Pt may be disposed on the Pt-M alloy catalyst. FIG. 13 depicts surface energies of (111), (110) and (100) facets of $Pt_3Co$ with additional layers (e.g. three layers) of Pt catalyst skin calculated by DFT simulations. As shown in FIG. 13, the surface energies of (111), (110) and (100) facets are changed to 1.45 $J/m^2$, 2.11 $J/m^2$, and 2.72 $J/m^2$, respectively, compared to those in FIG. 12B. In addition, the surface area of (111) facet is about 100%, whereas both (110) and (100) facets appear to disappear from the Wulff shape of $Pt_3Co$ with additional Pt catalyst skin layers.

Figure 14:
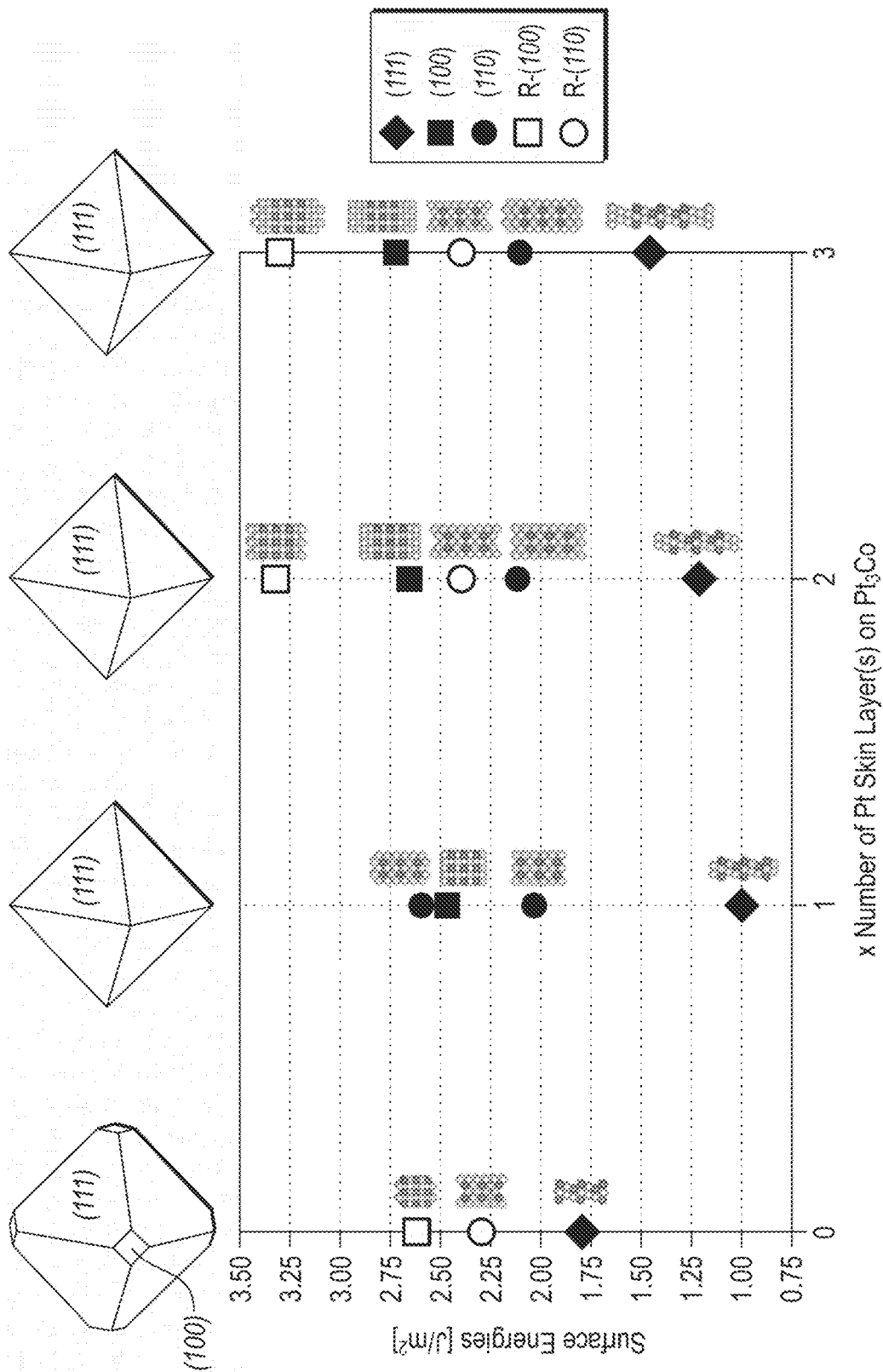
FIG. 14 depicts a diagram showing surface energies of (111), (110) and (100) facets in $Pt_3Co$ as a function of the number of Pt catalyst skin layers on $Pt_3Co$.

FIG. 14 depicts a diagram showing surface energies of (111), (110) and (100) facets in $Pt_{3+\delta}Co$ as a function of the number of Pt catalyst skin layers on $Pt_3Co$. The concentration of Pt in $Pt_{3+\delta}Co$ may increase due to surface treatments (i.e. depending on the amount of Pt added to the catalyst skin, $\delta$). As shown in FIG. 14, adding additional Pt catalyst skin layers can maximize the surface area of (111) facet, and thus increase the durability of $Pt_{3+\delta}Co$. In addition, FIG. 14 shows that adding additional Pt catalyst skin layers may lower the surface energy of (111) facet compared to pure Pt. At the same time, the surface energy of (111) facet may increase when the number of the Pt catalyst skin layers on $Pt_{3+\delta}Co$ also increases. Therefore, additional Pt catalyst skin layers on $Pt_3Co$ can prevent Co metal leaching and/or subsequent Pt dissolution and thus extend the lifetime of a fuel cell unit.

In light of the DFT calculations shown in FIGS. 6 through 14, material selection and inter-relationships may impact PEMFC performance, degradation, and lifetime. In one or more embodiments, a fuel cell stack is disclosed that includes three regions, where each of the three regions has at least one fuel cell unit including an MEA with a catalyst material. Based on locations of fuel cell units in the fuel cell stack, catalyst materials may vary. For example, if an area is more susceptible to catalyst degradation, catalyst materials that have superior durability (i.e., difficult to dissolve or degrade) may be applied to fuel cell units located in the area. Further, if an area is expected to operate in a steady state, catalyst materials that exhibit robust catalytic activity may be selected to fabricate MEAs of fuel cell units located in the area.

Catalyst materials used in fabricating MEAs of fuel cell units in the fuel cell stack may be varied in terms of, but not limited to, compositions, loadings, thicknesses, sizes, crystal facet distributions and catalyst support materials. Different catalyst materials may be selected depending on the desired properties in the fuel cell stack. Closest-pack catalyst surface planes, such as Pt(111), may be relatively stable in a working environment of the fuel cell stack. High index catalyst surfaces with edges and corners may induce high catalytic activities; however, such catalysts may degrade relatively faster. Further, catalyst nanoparticles that have small sizes may be more catalytically active, but more easily to dissolve in the working environment of the fuel cell stack.

FIG. 15 depicts a schematic perspective view of a fuel cell stack 300 according to one or more embodiments. Fuel cell stack 300 may include a first end region 320, a second end region 340 and a third end region 360. The first end region 320 may be connected to a first reactant inlet, which may be a hydrogen source that provides hydrogen to fuel cell stack 300. Similarly, the second end region 340 may be connected to a second reactant inlet, which may be an oxygen source that provides oxygen to fuel cell stack 300. The third end region 360 may be situated between the first and second end regions 320, 340.

At least one fuel cell unit, for example, fuel cell unit X, in the first region 320 may include an MEA with a first catalyst material on either or both an anode and a cathode of the fuel cell unit X, and the first catalyst material may include a first catalyst composition. Similarly, at least one fuel cell unit, for example, fuel cell unit Z, in the second region 340 may include an MEA with a second catalyst material on either or both an anode and a cathode of the fuel cell unit Z, and the second catalyst material may include a second catalyst composition. Likewise, at least one fuel cell unit, for example, fuel cell unit Y, in the third region 360 may include an MEA with a third catalyst material on either or both an anode and a cathode of the fuel cell unit Y, and the third catalyst material may include a third catalyst composition. According to locations of fuel cell units X, Y and Z in fuel cell stack 300, at least one of the first, the second, and the third catalyst composition are different. In a first embodiment, the first and the third catalyst composition are pure Pt whereas the second catalyst composition is a Pt-M alloy, wherein M can be, but not limited to, cobalt (Co), nickel (Ni), rhenium (Re), tungsten (W), molybdenum (Mo), germanium (Ge), tin (Sn), niobium (Nb), tantalum (Ta), and titanium (Ti). In a second embodiment, the first and the second catalyst composition are pure Pt while the third catalyst composition is a Pt-M alloy, wherein M can be, but not limited to, Co, Ni, Re, W, Mo, Ge, Sn, Nb, Ta, and Ti. In a third embodiment, each of the first and the third catalyst composition is a Pt-M alloy, wherein M can be, but not limited to, Co, Ni, Re, W, Mo, Ge, Sn, Nb, Ta, and Ti; and the second catalyst composition is pure Pt. In a fourth embodiment, each of the first and the second catalyst composition is a Pt-M alloy, wherein M can be, but not limited to, Co, Ni, Re, W, Mo, Ge, Sn, Nb, Ta, and Ti; and the third catalyst composition is pure Pt.

In another embodiment, the first, the second, and/or the third catalyst composition may be a Pt-M-M' alloy, where M can be, but not limited to, Co, Ni, Re, W, Mo, Ge, Sn, Nb, Ta, and Ti, and M' is an element different from M.

In yet another embodiment, the first, the second, and/or the third catalyst composition may include a core made of a Pt-M or a Pt-M-M' alloy and a catalyst skin made of pure Pt, where M can be, but not limited to, Co, Ni, Re, W, Mo, Ge, Sn, Nb, Ta, and Ti, and M' is an element different from M. The catalyst skin may be a single layer or multiple layers (less than five) of pure Pt. For example, the core of the first, the second, and/or the third catalyst composition is a Pt—Co alloy, such as PtCo, $PtCo_3$, $Pt_3Co$, or $Pt_xCo_{1-x}$ ($0 \leq x \leq 1$), and the catalyst skin of the core is a single layer or multiple layers (less than five) of pure Pt. Although, due to thermodynamic and/or kinetic effects, a catalyst skin with pure Pt is desired, a catalyst skin with a close composition to pure Pt (e.g. more than 75% Pt) may also provide robust catalytic activities in terms of an individual fuel cell. In addition, incorporation of a Pt catalyst skin onto a Pt-M or a Pt-M-M' alloy core may increase the (111) surface facet of the alloy, which may extend the lifetime of individual fuel cell units and reduce the overall cost of the PEMFC stack.

Catalyst loadings may also influence catalytic activities during an operation of a fuel cell stack. High catalyst loadings may extend a lifetime of the fuel cell stack and consequently boost the fuel cell stack performance. On the contrary, low catalyst loadings may accelerate catalyst consumption and affect fuel cell performance. Dynamically allocating catalyst loadings according to locations of fuel cell units in the fuel cell stack may thus influence the performance of the fuel cell stack. In FIG. 15, the first catalyst composition of fuel cell unit X may be loaded onto a first catalyst support of fuel cell unit X at a first loading, the second catalyst composition of fuel cell unit Z may be loaded onto a second catalyst support at a second loading, and the third catalyst composition of fuel cell unit Y may be loaded onto a third catalyst support at a third loading. According to locations of fuel cell units X, Y and Z in fuel cell stack 300, at least one of the first, the second, and the third loading are different.

In one embodiment, at least another fuel cell unit, for example, fuel cell unit X', in the first end region 320 is positioned between the first reactant inlet of the fuel cell stack 300 and the first fuel cell unit X. Fuel cell unit X' may include an MEA with a fourth catalyst material on either or both an anode and a cathode of the fuel cell unit X' that includes a fourth catalyst composition. The fourth catalyst composition may be loaded onto a fourth catalyst support at a fourth loading. Because fuel cell unit X' is located relatively closer to the first reactant inlet compared to fuel cell unit X, fuel cell unit X' may be more susceptible to degradation, including, but not limited to, a pooling of a liquid, an acid corrosion, a pressure drop, or a contaminant, than fuel cell unit X, especially during start-up/shutdown procedures of fuel cell stack 300. Therefore, in order to slow down catalyst degradation in the first end region 320 and improve the performance of fuel cell stack 300, the fourth loading in fuel cell unit X' may be higher than the first loading in fuel cell unit X in the first end region 320. Additionally, in one embodiment, the fourth catalyst composition in fuel cell unit X' may be pure Pt, especially Pt(111), and the first catalyst composition in fuel cell unit X may be a Pt-M alloy, wherein M can be, but not limited to, Co, Ni, Re, W, Mo, Ge, Sn, Nb, Ta, and Ti. In another embodiment, the fourth catalyst composition in fuel cell unit X' may be an Pt-M-M' alloy, where M can be, but not limited to, Co, Ni, Re, W, Mo, Ge, Sn, Nb, Ta, and Ti, and M' is an element different from M, and the first catalyst composition in fuel cell unit X may be a Pt-M alloy, wherein M can be, but not limited to, Co, Ni, Re, W, Mo, Ge, Sn, Nb, Ta, and Ti. In yet another embodiment, the fourth and/or the first catalyst composition may include a core made of a Pt-M or a Pt-M-M' alloy and a catalyst skin made of a single layer or multiple layers (less than five) of pure Pt or a close composition to pure Pt (e.g. more than 75% Pt), where M can be, but not limited to, Co, Ni, Re, W, Mo, Ge, Sn, Nb, Ta, and Ti, and M' is an element different from M.

Similarly, in another embodiment, at least another fuel cell unit, for example, fuel cell unit Z', in the second end region 340 is positioned between the second fuel cell unit Z and the second reactant inlet of the fuel cell stack 300. Fuel cell unit Z' may include an MEA with a fifth catalyst material on either or both an anode and a cathode of the fuel cell unit Z' that includes a fifth catalyst composition. The fifth catalyst composition of fuel cell unit Z' may be loaded onto a fifth catalyst support at a fifth loading. Because fuel cell unit Z' is located relatively closer to the second reactant inlet compared to fuel cell unit Z, fuel cell unit Z' may be more susceptible to degradation, including, but not limited to, a pooling of a liquid, an acid corrosion, a pressure drop, or a contaminant, than fuel cell unit Z, especially during start-up/shutdown procedures of fuel cell stack 300. Therefore, in order to slow down catalyst degradation in the second end region 340 and improve the performance of the fuel cell stack 300, the fifth loading of fuel cell unit Z' may be higher than the second loading of fuel cell unit Z in the second end region 340. Additionally, in one embodiment, the fifth catalyst composition of fuel cell unit Z' may be pure Pt, especially Pt(111), and the second catalyst composition of fuel cell unit Z may be a Pt-M alloy, wherein M can be, but not limited to, Co, Ni, Re, W, Mo, Ge, Sn, Nb, Ta, and Ti. In another embodiment, the fifth catalyst composition in fuel cell unit Z' may be an Pt-M-M' alloy, where M can be, but not limited to, Co, Ni, Re, W, Mo, Ge, Sn, Nb, Ta, and Ti, and M' is an element different from M, and the second catalyst composition in fuel cell unit Z may be a Pt-M alloy, wherein M can be, but not limited to, Co, Ni, Re, W, Mo, Ge, Sn, Nb, Ta, and Ti. In yet another embodiment, the fifth and/or the second catalyst composition may include a core made of a Pt-M or a Pt-M-M' alloy and a catalyst skin made of a single layer or multiple layers (less than five) of pure Pt or a close composition to pure Pt (e.g. more than 75% Pt), where M can be, but not limited to, Co, Ni, Re, W, Mo, Ge, Sn, Nb, Ta, and Ti, and M' is an element different from M.

Likewise, in yet another embodiment, at least another fuel cell unit, for example, fuel cell unit Y', in the middle region 360 of fuel cell stack 300 may include an MEA with a sixth catalyst material on either or both an anode and a cathode of the fuel cell unit Y' that includes a sixth catalyst composition. The sixth catalyst composition of fuel cell unit Y' may be loaded onto a sixth catalyst support at a sixth loading. Assume that fuel cell unit Y' may be more susceptible to degradation, including, but not limited to, a pooling of a liquid, an acid corrosion, a pressure drop, or a contaminant, than fuel cell unit Y. In order to slow down catalyst degradation in the middle region 360 and improve the performance of the fuel cell stack 300, the sixth loading of fuel cell unit Y' may be higher than the third loading of fuel cell unit Y. Additionally, in one embodiment, the sixth catalyst composition of fuel cell unit Y' may be pure Pt, especially Pt(111), and the third catalyst composition of fuel cell unit Y may be a Pt-M alloy, wherein M can be, but not limited to, Co, Ni, Re, W, Mo, Ge, Sn, Nb, Ta, and Ti. In another embodiment, the sixth catalyst composition in fuel cell unit Y' may be an Pt-M-M' alloy, where M can be, but not limited to, Co, Ni, Re, W, Mo, Ge, Sn, Nb, Ta, and Ti, and M' is an element different from M, and the third catalyst composition in fuel cell unit Y may be a Pt-M alloy, wherein M can be, but not limited to, Co, Ni, Re, W, Mo, Ge, Sn, Nb, Ta, and Ti. In yet another embodiment, the sixth and/or the third catalyst composition may include a core made of a Pt-M or a Pt-M-M' alloy and a catalyst skin made of a single layer or multiple layers (less than five) of pure Pt or a close composition to pure Pt (e.g. more than 75% Pt), where M can be, but not limited to, Co, Ni, Re, W, Mo, Ge, Sn, Nb, Ta, and Ti, and M' is an element different from M.

Apart from catalyst compositions and catalyst loadings, catalyst crystal facet distributions may also significantly influence the performance of a fuel cell stack. Pt catalysts with various facets may show diverse catalytic activities in different reaction processes. The catalytic activity of Pt catalysts may be dependent upon an exposed facet, including a surface atomic arrangement and coordination, of the Pt catalysts. As discussed in FIG. 6, Pt(110) and Pt(100) catalyst surfaces may be more catalytically active for an ORR reaction than Pt(111) catalyst surface; and on the other hand, Pt(111) catalyst surface may achieve a higher catalyst durability. Therefore, referring to FIG. 15, the first catalyst material on either or both the anode and the cathode of fuel cell unit X in the first end region 320 may have a first catalyst crystal facet distribution, the second catalyst material on either or both the anode and the cathode of fuel cell unit Z in the second end region 340 may have a second catalyst crystal facet distribution, and the third catalyst material on either or both the anode and the cathode of fuel cell unit Y in the middle region 360 may have a third catalyst crystal facet distribution. According to locations of fuel cell units X, Y and Z in fuel cell stack 300, at least one of the first, the second, and the third catalyst crystal facet distribution are different. In one or more embodiments, the first catalyst crystal facet distribution of fuel cell unit X may be Pt(100), Pt(110), or Pt(111); the second catalyst crystal facet distribution of fuel cell unit Z may be Pt(100), Pt(110), or Pt(111); and the third catalyst crystal facet distribution of fuel cell unit Y may be Pt(100), Pt(110), and Pt(111). The distribution of Pt facets can be measured due to various technique such as X-ray diffraction (XRD) analysis or high-resolution transmission electron microscopy (HR-TEM).

In another embodiment, to increase the performance of fuel cell stack 300, the fourth catalyst material on either or both the anode and the cathode of fuel cell unit X' in the first end region 320 may include a fourth catalyst crystal facet distribution, which may be different from that of fuel cell unit X in that region. In yet another embodiment, to increase the performance of fuel cell stack 300, the fifth catalyst material on either or both the anode and the cathode of fuel cell unit Z' in the second end region 340 may include a fifth catalyst crystal facet distribution, which may be different from that of fuel cell unit Z in that region. Similarly, in still another embodiment, to increase the performance of fuel cell stack 300, the sixth catalyst material on either or both the anode and the cathode of fuel cell unit Y' in the middle region 360 may include a sixth catalyst crystal facet distribution, which may be different from that of fuel cell unit Y in that region. Specifically, the fourth catalyst crystal facet distribution of fuel cell unit X' may be Pt(100), Pt(110), or Pt(111); the fifth catalyst crystal facet distribution of fuel cell unit Z' may be Pt(100), Pt(110), or Pt(111); and the sixth catalyst crystal facet distribution of fuel cell unit Y' may be Pt(100), Pt(110), or Pt(111).

Variation of catalyst support materials for fuel cell units in a fuel cell stack may be another strategy to optimize catalytic activities of the fuel cell units and enhance the performance of the fuel cell stack. Selection of different types of carbon-based catalyst support materials may introduce different degrees of surface areas and graphitization (i.e. $sp^2$ vs. $sp^3$ carbon), which may subsequently influence the binding between a catalyst support and a catalyst supported by the catalyst support. Common catalyst support materials used in fabricating a fuel cell unit may include, but not limited to, carbon black and fibrous carbon. In addition to $sp^3$ type amorphous carbon, $sp^2$ carbon materials, such as graphite, graphene, graphene oxide, reduced graphene oxide, defective graphene, defected graphite, or graphyne, may also be used as catalyst support materials. Further, catalyst support materials may be oxides, including, but not limited to, titanium oxide (TiO, $Ti_2O_3$, and/or $TiO_2$), tin oxide (SnO, $SnO_2$), molybdenum oxide ($MoO_x$, $0 \le x \le 3$), niobium oxide ($Nb_2O_5$), magnesium titanium oxide ($MgTi_2O^{5-x}$, $0 \le x \le 5$) or titanium-tin oxide ($TiSnO_x$, $0 \le x \le 4$).

In FIG. 15, the first catalyst material on either or both the anode and the cathode of fuel cell unit X in the first end region 320 may include a first catalyst support with a first catalyst support material, the second catalyst material on either or both the anode and the cathode of fuel cell unit Z in the second end region 340 may include a second catalyst support with a second catalyst support material, and the third catalyst material on either or both the anode and the cathode of fuel cell unit Y in the middle region 360 may include a third catalyst support with a third catalyst support material. According to locations of fuel cell units X, Y and Z in fuel cell stack 300, at least one of the first, the second, and the third catalyst support material are different. Specifically, the first catalyst support material of fuel cell unit X may be carbon black, fibrous carbon, graphite, graphene, graphene oxide, reduced graphene oxide, defective graphene, defected graphite, graphyne, titanium oxide (TiO, $Ti_2O_3$, and/or $TiO_2$), tin oxide (SnO, $SnO_2$), molybdenum oxide ($MoO_x$, $0 \le x \le 3$), niobium oxide ($Nb_2O_5$), magnesium titanium oxide ($MgTi_2O_{5-x}$, $0 \le x \le 5$) or titanium-tin oxide ($TiSnO_x$, $0 \le x \le 4$); the second catalyst support material of fuel cell unit Z may be carbon black, fibrous carbon, graphite, graphene, graphene oxide, reduced graphene oxide, defective graphene, defected graphite, graphyne, titanium oxide (TiO, $Ti_2O_3$, and/or $TiO_2$), tin oxide (SnO, $SnO_2$), molybdenum oxide ($MoO_x$, $0 \le x \le 3$), niobium oxide ($Nb_2O_5$), magnesium titanium oxide ($MgTi_2O_{5-x}$, $0 \le x \le 5$) or titanium-tin oxide ($TiSnO_x$, $0 \le x \le 4$); and the third catalyst support material of fuel cell unit Y may be carbon black, fibrous carbon, graphite, graphene, graphene oxide, reduced graphene oxide, defective graphene, defected graphite, graphyne, titanium oxide (TiO, $Ti_2O_3$, and/or $TiO_2$), tin oxide (SnO, $SnO_2$), molybdenum oxide ($MoO_x$, $0 \le x \le 3$), niobium oxide ($Nb_2O_5$), magnesium titanium oxide ($MgTi_2O_{5-x}$, $0 \le x \le 5$) or titanium-tin oxide ($TiSnO_x$, $0 \le x \le 4$).

In one or more embodiments, the first catalyst support of fuel cell unit X may support a first catalyst material, and the first catalyst material may include a first catalyst composition. Likewise, the second catalyst support of fuel cell unit Z may support a second catalyst material, and the second catalyst material may include a second catalyst composition. Also, the third catalyst support of fuel cell unit Y may support a third catalyst material, and the third catalyst material may include the third catalyst composition. According to locations of fuel cell units X, Y and Z in fuel cell stack 300, at least one of the first, the second, and the third catalyst composition are different. In any of the embodiments, the first catalyst composition of fuel cell unit X may be pure Pt, a Pt-M alloy, or a Pt-M-M' alloy, wherein M can be, but not limited to, Co, Ni, Re, W, Mo, Ge, Sn, Nb, Ta, and Ti, and M' is an element different from M; the second catalyst composition of fuel cell unit Z may be pure Pt, a Pt-M alloy, or a Pt-M-M' alloy, wherein M can be, but not limited to, Co, Ni, Re, W, Mo, Ge, Sn, Nb, Ta, and Ti, and M' is an element different from M; and the third catalyst composition of fuel cell unit Y may be pure Pt, a Pt-M alloy, or a Pt-M-M' alloy, wherein M can be, but not limited to, Co, Ni, Re, W, Mo, Ge, Sn, Nb, Ta, and Ti, and M' is an element different from M.

In addition to the above variations regarding catalyst materials, electrode thicknesses may also affect catalytic activities of individual fuel cell units in the PEMFC stack. Generally, there are two common methods for processing catalysts when fabricating a membrane electrode assembly (MEA) of a fuel cell unit: 1) a decal transfer method (DTM), and 2) direct coating on a membrane (i.e., a polymer electrolyte membrane) (DCM). Specifically, the method of decal transfer, i.e., the DTM, may uniformly coat catalyst inks using a blank polymer film, such as polyethylene terephthalate (PET). Catalyst layers (CLs) of either or both an anode and a cathode of the fuel cell unit may then be transferred from the PET film to the membrane via hot-pressing at temperatures between 60 and 250° C. (preferably, ~150° C.) for a period of 1 to 30 mins (preferably, ~10 mins). Alternatively, when preparing CLs using the second method, i.e., the DCM, catalyst inks may be directly coated onto a membrane (i.e., a polymer electrolyte membrane) in a uniform fashion while the membrane being held onto a vacuum plate with mask films. After removing the mask films, the resulting membrane may be dried for 1 to 72 hours (preferably, ~24 h) in an oven (e.g. vacuum oven) at temperatures between 60 and 150° C. (preferably, ~120° C.). Hot-pressing may then be performed at three (or more) different temperatures (e.g. 140, 150, and 160° C.) for a period of 1 to 30 minutes for controlling the porosity and contact resistance of the CLs. A catalyst-coated membrane (CCM) prepared using either of the two methods may require a pre-treatment step in a solution that contains methanol and/or sulfuric acid at an elevated temperature (e.g. 95° C.) for varying time periods, for example, 30 mins to 12 hrs, (preferably, ~4 hours). The MEA can be formed by placing GDLs onto the corresponding sides of the CCM through hot-pressing at an elevated temperature (e.g. 125° C.).

Regarding an individual fuel cell unit, an anode thickness may vary between 0.5 and 50 μm, preferably between 2 to 10 μm. An anode catalyst layer may be hot-pressed onto a mesoporous layer (MPL) and/or a gas diffusion layer (GDL). Similarly, a cathode thickness may vary between 1 and 50 μm, preferably between 5 to 20 μm. Different GLDs may be used with either or both an anode and a cathode of the fuel cell unit, where a GDL thickness including the MPL may vary from 50 to 400 μm, preferably around 150 to 200 μm. The MPL may or may not be present, and a thickness of the MPL may vary from 1 to 60 μm. Therefore, in one or more of the above embodiments, the first catalyst material on either or both the anode and the cathode of fuel cell X has a first electrode thickness, the second catalyst material on either or both the anode and the cathode of fuel cell Z has a second electrode thickness, the third catalyst material on either or both the anode and the cathode of fuel cell Y has a third electrode thickness. According to locations of fuel cell units X, Y and Z in fuel cell stack 300, at least one of the first, the second, and the third electrode thickness are different. Specifically, the first electrode thickness of fuel cell X may be in a range of 0.5 and 50 μm; the second electrode thickness of fuel cell Z may be in a range of 0.5 and 50 μm; and the third electrode thickness of fuel cell Y may be in a range of 0.5 and 50 μm. Here, the thickness of each fuel unit may vary depending on an exact configuration of a catalyst coated membrane (CCM) and/or a membrane assembly electrode (MEA). Different types of GDL/MPL may be incorporated into the fuel cell unit.

Ionomers are used in an MEA of a fuel cell unit as an electrolyte for proton conduction, and to maintain a catalyst layer as a binder. Common ionomers adopted in fabricating an MEA of a fuel cell unit can be, but not limited to, perfluorosulfonic acid polymers, polystyrene sulfonate, or Nafion. An ionomer-carbon (I/C) ratio of a fuel cell unit may be in a range of 0.1 and 2. In operation, a low concentration of ionomer in the fuel cell unit may cause a decrease in the proton conduction and may lead to a decrease in the fuel cell stack performance. In addition, an excess concentration of ionomer may block a space volume, which may not only prevent reactants (i.e. $H_2$ and $O_2$) from entering the fuel cell stack but also prevent the product (i.e. water) from leaving the fuel cell stack. Consequently, this may lead to a decrease in the fuel cell stack performance. In addition, ionomers may vary in equivalent weight (EW), side chain length and side chain chemistry (i.e. types of chemical groups). Therefore, modifying I/C ratios of fuel cell units in the fuel cell stack may also affect the fuel cell stack performance.

In FIG. 15, fuel cell unit X in the first end region 320 may include an MEA with a first I/C ratio, fuel cell unit Z in the second end region 340 may include an MEA with a second I/C ratio, and fuel cell unit Y in the middle region 360 may include a third I/C ratio. According to locations of fuel cell units X, Y and Z in fuel cell stack 300, at least one of the first, the second, and the third I/C ratio are different. Specifically, the first I/C ratio may be in a range of 0.1 and 2, the second I/C ratio may be in a range of 0.1 and 2, the third I/C ratio may be in a range of 0.1 and 2.

Apart from the strategies discussed above, other strategies may also be available for improving the fuel cell stack performance and extending the fuel cell stack life. For example, tuning water environment (e.g. water uptake or humidity control), controlling catalyst poisoning, enhancing oxygen diffusivity, changing catalyst porosity and/or catalyst tortuosity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell stack comprising:
   a first end region having a first number of fuel cell units, the first end region connected to a first reactant inlet, the first reactant inlet connected to a first reactant source configured to provide a first reactant to the fuel cell stack, the first reactant source being a hydrogen source, at least one of the first number of fuel cell units being a first fuel cell unit including a membrane electrode assembly (MEA) with a first catalyst material on either or both an anode and a cathode of the first fuel cell unit, the first catalyst material including a first catalyst composition;

a second end region having a second number of fuel cell units, the second end region connected to a second reactant inlet, the second reactant inlet connected to a second reactant source configured to provide a second reactant to the fuel cell stack, the second reactant source being an oxygen source, at least one of the second number of fuel cell units being a second fuel cell unit including an MEA with a second catalyst material on either or both an anode and a cathode of the second fuel cell unit, the second catalyst material including a second catalyst composition; and a middle region having a third number of fuel cell units, the middle region situated between the first and the second end region, at least one of the third number of fuel cell units being a third fuel cell unit including an MEA with a third catalyst material on either or both an anode and a cathode of the third fuel cell unit, the third catalyst material including a third catalyst composition, the first catalyst composition has a first catalytic activity and a first durability, the second catalyst composition has a second catalytic activity and a second durability, the third catalyst composition has a third catalytic activity and a third durability, the second catalytic activity is higher than the first and third catalytic activities, the first and third durabilities are higher than the second durability, at least one of the first, the second, and the third catalyst composition being different.

2. The fuel cell stack of claim 1, wherein
the first catalyst composition is selected from the group consisting of pure Pt, a Pt-M alloy, and a Pt-M-M' alloy, M is a metal element, and M' is a metal element different than M;
the second catalyst composition is selected from the group consisting of pure Pt, a Pt-M alloy, and a Pt-M-M' alloy; and
the third catalyst composition is selected from the group consisting of pure Pt, a Pt-M alloy and a Pt-M-M' alloy.

3. The fuel cell stack of claim 2, wherein M and M' are each selected from the group consisting of Co, Ni, Re, W, Mo, Ge, Sn, Nb, Ta, and Ti.

4. The fuel cell stack of claim 1, wherein
the first catalyst composition includes a first catalyst core made of an alloy and a catalyst skin made of pure Pt, the alloy being selected from the group consisting of a Pt-M alloy and a Pt-M-M' alloy, M is a metal element, M' is a metal element different than M, M and M' are each selected from the group consisting of Co, Ni, Re, W, Mo, Ge, Sn, Nb, Ta, and Ti;
the second catalyst composition includes a second catalyst core made of an alloy and a catalyst skin made of pure Pt, the alloy being selected from the group consisting of a Pt-M alloy and a Pt-M-M' alloy, M and M' are each selected from the group consisting of Co, Ni, Re, W, Mo, Ge, Sn, Nb, Ta, and Ti; and
the third catalyst composition includes a third catalyst core made of an alloy and a catalyst skin made of pure Pt, the alloy being selected from the group consisting of a Pt-M alloy and a Pt-M-M' alloy, M and M' are each selected from the group consisting of Co, Ni, Re, W, Mo, Ge, Sn, Nb, Ta, and Ti, and at least one of the first, the second, and the third catalyst core being different.

5. The fuel cell stack of claim 1, wherein
the first catalyst composition is loaded onto a first catalyst support at a first loading;
the second catalyst composition is loaded onto a second catalyst support at a second loading; and
the third catalyst composition is loaded onto a third catalyst support at a third loading, at least one of the first, the second, and the third loading being different.

6. The fuel cell stack of claim 5, wherein at least another one of the first number of fuel cell units being a fourth fuel cell unit including an MEA with a fourth catalyst material on either or both an anode and a cathode of the fourth fuel cell unit, the fourth fuel cell unit positioned between the first reactant inlet and the first fuel cell unit, the fourth fuel cell unit being more susceptible to a pooling of a liquid, an acid corrosion, a pressure drop or a contaminant than the first fuel cell unit, the fourth catalyst material including a fourth catalyst composition, the fourth catalyst composition being different from the first catalyst composition, the fourth catalyst composition being loaded onto a fourth catalyst support at a fourth loading, the fourth loading being higher than the first loading.

7. The fuel cell stack of claim 5, wherein at least another one of the second number of fuel cell units being a fifth fuel cell unit including an MEA with a fifth catalyst material on either or both an anode and a cathode of the fifth fuel cell unit, the fifth fuel cell unit positioned between the second fuel cell unit and the second reactant inlet, the fifth fuel cell unit being more susceptible to a pooling of a liquid, an acid corrosion, a pressure drop or a contaminant than the second fuel cell unit, the fifth catalyst material including a fifth catalyst composition, the fifth catalyst composition being different from the second catalyst composition, the fifth catalyst composition being loaded onto a fifth catalyst support at a fifth loading, the fifth loading being higher than the second loading.

8. The fuel cell stack of claim 5, wherein at least another one of the third number of fuel cell units being a sixth fuel cell unit including an MEA with a sixth catalyst material, the sixth fuel cell unit being more susceptible to a pooling of a liquid, an acid corrosion, a pressure drop or a contaminant than the third fuel cell unit, the sixth catalyst material including a sixth catalyst composition, the sixth catalyst composition being different from the third catalyst composition, the sixth catalyst composition being loaded onto a sixth catalyst support at a sixth loading, the sixth loading being higher than the third loading.

9. The fuel cell stack of claim 1, wherein the first and third catalyst compositions are pure Pt and the second catalyst composition is a Pt-M alloy, where M is a metal element.

10. The fuel cell stack of claim 1, wherein the Pt-M alloy is $Pt_3Co$.

11. A fuel cell stack comprising:
a first end region having a first number of fuel cell units, the first end region connected to a first reactant inlet, the first reactant inlet connected to a first reactant source configured to provide a first reactant to the fuel cell stack, the first reactant source being a hydrogen source, at least one of the first number of fuel cell units being a first fuel cell unit including a membrane electrode assembly (MEA) with a first catalyst material on either or both an anode and a cathode of the first fuel cell unit, the first catalyst material including a first catalyst composition;
a second end region having a second number of fuel cell units, the second end region connected to a second reactant inlet, the second reactant inlet connected to a second reactant source configured to provide a second reactant to the fuel cell stack, the second reactant source being an oxygen source, at least one of the second number of fuel cell units being a second fuel cell unit including an MEA with a second catalyst material on either or both an anode and a cathode of the second fuel cell unit, the second catalyst material including a second catalyst composition; and a middle region having a third number of fuel cell units, the middle region situated between the first and the second end region, at least one of the third number of fuel cell units being a third fuel cell unit including an MEA with a third catalyst material on either or both an anode and a cathode of the third fuel cell unit, the third catalyst material including a third catalyst composition, the first catalyst material includes a first catalyst crystal facet distribution having a first catalytic activity and a first durability, the second catalyst material has a second catalyst crystal facet distribution having a second catalytic activity and a second durability, the third catalyst material has a third catalyst crystal facet distribution having a third catalytic activity and a third durability, the second catalytic activity is higher than the first and third catalytic activities, and the first and third durabilities are higher than the second durability.

12. The fuel cell stack of claim 11, wherein the first and third catalyst crystal facet distributions are Pt(111).

13. The fuel cell stack of claim 11, wherein the second catalyst crystal facet distribution is Pt(110).

14. The fuel cell stack of claim 11, wherein the second catalyst crystal facet distribution is Pt(100).

15. The fuel cell stack of claim 11, wherein the first and third catalyst crystal facet distributions are Pt(111) and the second catalyst crystal facet distribution is Pt(110) or Pt(100).

16. A fuel cell stack comprising:
a first end region having a first number of fuel cell units, the first end region connected to a first reactant inlet, the first reactant inlet connected to a first reactant source configured to provide a first reactant to the fuel cell stack, the first reactant source being a hydrogen source, at least one of the first number of fuel cell units being a first fuel cell unit including a membrane electrode assembly (MEA) with a first catalyst material on either or both an anode and a cathode of the first fuel cell unit, the first catalyst material including a first catalyst composition;

a second end region having a second number of fuel cell units, the second end region connected to a second reactant inlet, the second reactant inlet connected to a second reactant source configured to provide a second reactant to the fuel cell stack, the second reactant source being an oxygen source, at least one of the second number of fuel cell units being a second fuel cell unit including an MEA with a second catalyst material on either or both an anode and a cathode of the second fuel cell unit, the second catalyst material including a second catalyst composition; and a middle region having a third number of fuel cell units, the middle region situated between the first and the second end region, at least one of the third number of fuel cell units being a third fuel cell unit including an MEA with a third catalyst material on either or both an anode and a cathode of the third fuel cell unit, the third catalyst material including a third catalyst composition, the first catalyst material having a first catalytic activity and a first durability, the second catalyst material having a second catalytic activity and a second durability, the third catalyst material having a third catalytic activity and a third durability, the second catalytic activity is higher than the first and third catalytic activities, and the first and third durabilities are higher than the second durability, the second catalyst material having a catalyst skin formed of pure Pt.

17. The fuel cell stack of claim 16, wherein the catalyst skin formed of pure Pt has one to five layers of pure Pt.

18. The fuel cell stack of claim 16, wherein the first and third catalyst materials include pure Pt.

19. The fuel cell stack of claim 16, wherein the second catalyst material is a Pt-M alloy, where M is a metal element.

20. The fuel cell stack of claim 19, wherein the Pt-M alloy is $Pt_3Co$.

* * * * *